US008732611B2

(12) United States Patent  
Bull et al.

(10) Patent No.: US 8,732,611 B2  
(45) Date of Patent: May 20, 2014

(54) GRAPHICAL USER INTERFACE FOR MOBILE ELECTRONIC DEVICE

(75) Inventors: William E. Bull, Campbell, CA (US); Policarpo Wood, Cupertino, CA (US)

(73) Assignee: Apple Inc., Cupertino, CA (US)

(*) Notice: Subject to any disclaimer, the term of this patent is extended or adjusted under 35 U.S.C. 154(b) by 1290 days.

(21) Appl. No.: 11/849,923

(22) Filed: Sep. 4, 2007

(65) Prior Publication Data

US 2009/0064057 A1    Mar. 5, 2009

(51) Int. Cl.  
*G06F 3/048* (2013.01)

(52) U.S. Cl.  
USPC ........... 715/810; 715/717; 715/777; 715/853; 715/748

(58) Field of Classification Search  
USPC .......................... 715/810, 717, 777, 853, 748  
See application file for complete search history.

(56) References Cited

U.S. PATENT DOCUMENTS

| | | | |
|---|---|---|---|
| 5,664,133 A | 9/1997 | Malamud et al. | |
| 6,741,270 B1 * | 5/2004 | Rzepkowski et al. | 715/810 |
| 7,043,477 B2 * | 5/2006 | Mercer et al. | 1/1 |
| 7,093,201 B2 * | 8/2006 | Duarte | 715/853 |
| 7,166,791 B2 | 1/2007 | Robbin et al. | |
| 7,400,351 B2 * | 7/2008 | Zhang et al. | 348/240.99 |
| 7,428,708 B2 * | 9/2008 | Okamoto et al. | 715/777 |
| 7,457,515 B1 * | 11/2008 | Faria | 386/52 |
| 7,512,882 B2 * | 3/2009 | Fong et al. | 715/716 |
| 7,521,625 B2 | 4/2009 | Robbin et al. | |
| 7,560,637 B1 | 7/2009 | Robbin et al. | |
| 7,673,240 B2 * | 3/2010 | Morgan | 715/717 |
| 7,917,861 B2 | 3/2011 | Boettcher et al. | |
| 8,294,730 B2 | 10/2012 | Tremblay et al. | |
| 2003/0182139 A1 * | 9/2003 | Harris et al. | 705/1 |
| 2005/0155058 A1 * | 7/2005 | Jung et al. | 725/38 |
| 2005/0278656 A1 * | 12/2005 | Goldthwaite et al. | 715/810 |
| 2006/0197753 A1 | 9/2006 | Hotelling | |
| 2007/0038941 A1 | 2/2007 | Wysocki et al. | |

(Continued)

FOREIGN PATENT DOCUMENTS

| | | |
|---|---|---|
| EP | 1 783 586 | 5/2007 |
| EP | 1 783 586 A | 5/2007 |

(Continued)

OTHER PUBLICATIONS

"Communication Relating to the Results of the Partial International Search" for PCT Application No. PCT/US/2008/074954, mailed Oct. 14, 2009.

(Continued)

*Primary Examiner* — Michael Roswell  
(74) *Attorney, Agent, or Firm* — Fish & Richardson P.C.

(57) ABSTRACT

Improved approaches to display information on a portable computing device having a display with limited display area are disclosed. The information displayed can, for example, assist a user in navigating a hierarchical menu system operable on the portable computing device to browse, search or play media items. The information displayed can include a menu of the hierarchical menu system along with other information. The menu can include selectable media items. The other information can be related to the menu being displayed. In one embodiment, the invention can use a display screen having at least first and second portions, with the first portion displaying selectable media items (e.g., menu) and with the second portion displaying media information (e.g., graphical image) that is dependent on media items in the first portion or resident on the portable electronic device.

34 Claims, 28 Drawing Sheets

(56) References Cited

U.S. PATENT DOCUMENTS

| | | |
|---|---|---|
| 2007/0074118 A1 | 3/2007 | Robbin et al. |
| 2007/0124680 A1 | 5/2007 | Robbin et al. |
| 2007/0192708 A1 | 8/2007 | Lee et al. |
| 2007/0271065 A1 | 11/2007 | Gupta et al. |
| 2007/0271116 A1 | 11/2007 | Wysocki et al. |
| 2008/0065720 A1* | 3/2008 | Brodersen et al. ............ 709/203 |
| 2008/0065988 A1 | 3/2008 | Gupta et al. |
| 2008/0126933 A1 | 5/2008 | Gupta et al. |
| 2008/0270913 A1* | 10/2008 | Singer et al. ................ 715/748 |
| 2009/0058863 A1 | 3/2009 | Avkarogullari et al. |
| 2009/0063972 A1 | 3/2009 | Ma et al. |

FOREIGN PATENT DOCUMENTS

| | | |
|---|---|---|
| EP | 1 811 522 A | 7/2007 |
| EP | 1 811 552 | 7/2007 |
| EP | 1 818 761 A | 8/2007 |
| WO | WO 01/61444 A | 8/2001 |

OTHER PUBLICATIONS

International Search Report and Written Opinion for PCT Application No. PCT/US2008/074954, mailed Nov. 30, 2009.

International Preliminary Report on Patentability for PCT Application No. PCT/US2008/074954, mailed Mar. 18, 2010.

* cited by examiner

GRAPHICAL USER INTERFACE FOR MOBILE ELECTRONIC DEVICE

CROSS-REFERENCE TO OTHER APPLICATION

This application references U.S. patent application Ser. No. 11/849,935, filed Sep. 4, 2007, entitled "MULTI-PANE GRAPHICAL USER INTERFACE FOR MOBILE ELECTRONIC DEVICE", which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

1. Field of the Invention

The present invention relates to mobile electronic devices and, more particularly, to graphical user interfaces for mobile electronic devices.

2. Description of the Related Art

Mobile devices, such as Personal Digital Assistants (PDAs), digital media players and mobile phones, often include displays which are used to present graphical user interfaces. These graphical user interfaces provide a means for the mobile devices to present information to users. However, since mobile devices are usually desired to be small and lightweight, it is difficult for mobile devices to include large displays while also being small and lightweight. Hence, there are difficult design tradeoffs in designing mobile devices because a larger display typically requires a larger device. Thus, since the size of displays on mobile devices is limited, there is a need to better utilize displays on mobile devices.

SUMMARY OF THE INVENTION

The invention pertains to improved approaches to display information on a portable computing device having a display with limited display area. The information displayed can, for example, assist a user in navigating a hierarchical menu system operable on the portable computing device to browse, search or play media items. The information displayed can include a menu of the hierarchical menu system along with other information. The menu can include selectable media items. The other information can be related to the menu being displayed. In one embodiment, the invention can use a display screen having at least first and second portions, with the first portion displaying selectable media items and with the second portion displaying media information that is dependent on media items in the first portion or resident on the portable electronic device.

The invention can be implemented in numerous ways, including as a method, system, device, or apparatus (including graphical user interface and computer readable medium). Several embodiments of the invention are discussed below.

As a method for presenting a display screen on a display of a portable electronic device, one embodiment of the invention includes, for example, at least the acts of: identifying a display screen to be displayed on the display of the portable electronic device, the identified display screen being one of a plurality of display screens that are available to be displayed on the display of the portable electronic device, and the identified display screen having at least a first pane and a second pane; displaying selectable menu items in the first pane of the identified display screen; and displaying contextually relevant information in the second pane of the identified display screen.

As a method for presenting media information on a display of a portable electronic device, one embodiment of the invention includes, for example, at least the acts of: displaying a first menu in a first portion of a display screen on the display, the first menu including a plurality of selectable menu items; determining a first media item to be displayed from a plurality of media items resident on the portable electronic device; displaying a graphic corresponding to the first media item in a second potion of the display screen on the display; subsequently determining a second media item to be displayed from the plurality of media items resident on the portable electronic device; and thereafter displaying a graphic corresponding to the second media item in the second potion of the display screen on the display.

As a method for presenting media items associated with a media collection, one embodiment of the invention includes, for example, at least the acts of: displaying a list of media collection designators corresponding to media collections; visually identifying one of the media collection designators within the list of media collection designators being displayed; receiving a user selection of one of the media collections that corresponds to the identified media collection designator; displaying a list of media item designators corresponding to media items within the selected media collection while no longer displaying the list of media collection designators; visually identifying one of the media items within the list of media item designators being displayed; displaying, while the list of media item designators is also being displayed, a graphical image corresponding to the selected media collection or the identified media item; receiving a user selection of one of the media items that corresponds to the identified media item; displaying the graphical image corresponding to the selected media collection or the identified media item while no longer displaying the list of media item designators; and initiating playback of the selected media item.

As a computer readable medium including at least executable computer program code tangibly stored thereon for presenting a display screen on a display of a portable electronic device, one embodiment of the invention includes at least: computer program code for identifying a display screen to be displayed on the display of the portable electronic device, the identified display screen being one of a plurality of display screens that are available to be displayed on the display of the portable electronic device, and the identified display screen having at least a first portion and a second portion; computer program code for displaying selectable menu items in the first portion of the identified display screen; and computer program code for displaying contextually relevant information in the second portion of the identified display screen.

As a graphical user interface for a portable electronic device, one embodiment of the invention includes at least: a first portion that display a particular menu from a plurality of menus that form a hierarchical menu system, the particular menu including a plurality of selectable items; and a second portion that displays at least a portion of a particular graphical image, the particular graphical image being chosen from a plurality of graphical images based on (i) a designated one of the selectable menu items in the first portion or (ii) a media item stored on the portable electronic device.

As a mobile computing device, one embodiment of the invention includes at least: a display device for displaying a graphic user interface; and a processing device for operating to present the graphical user interface on the display device. The graphical user interface includes at least: a first portion that displays a particular menu from a plurality of menus that form a hierarchical menu system, the particular menu including a plurality of selectable items; and a second portion that displays at least a portion of a particular graphical image, the particular graphical image being chosen from a plurality of graphical images based on (i) a designated one of the selectable menu items in the first portion or (ii) a media item stored on the portable electronic device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved approaches to display information on a portable computing device having a display with limited display area. The information displayed can, for example, assist a user in navigating a hierarchical menu system operable on the portable computing device to browse, search or play media items. The information displayed can include a menu of the hierarchical menu system along with other information. The menu can include selectable media items. The other information can be related to the menu being displayed. In one embodiment, the invention can use a display screen having at least first and second portions, with the first portion displaying selectable media items and with the second portion displaying media information that is dependent on media items in the first portion or resident on the portable electronic device.

In one embodiment, the other information or media information being displayed in the second portion is a graphical image. According to one implementation, when the second portion is undersized for complete display of the graphical image, the graphical image can be displayed in a skewed manner.

Embodiments of the invention are discussed below with reference to FIGS. 1-17. However, those skilled in the art will readily appreciate that the detailed description given herein with respect to these figures is for explanatory purposes as the invention extends beyond these limited embodiments.

Figure 1:
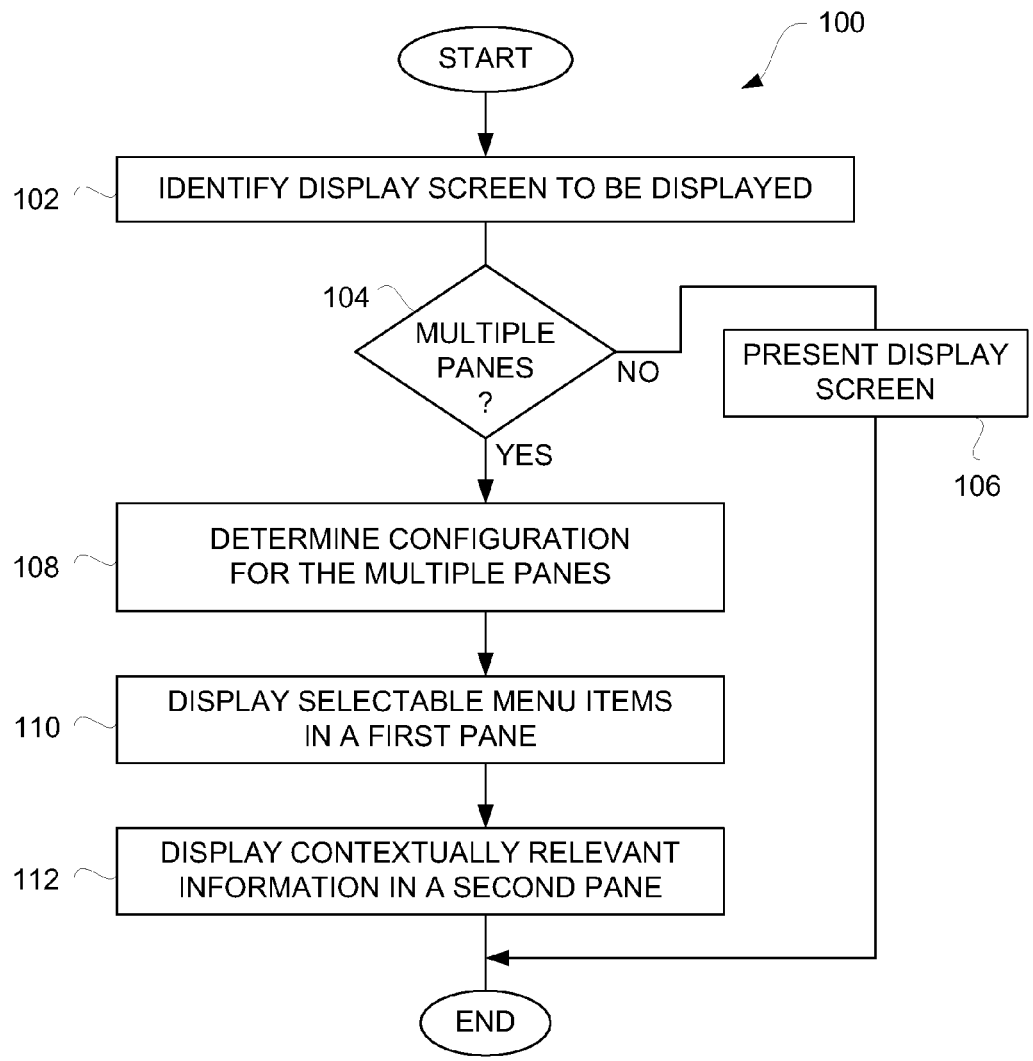
FIG. 1 is a flow diagram of a screen presentation process according to one embodiment of the invention.

FIG. 1 is a flow diagram of a screen presentation process 100 according to one embodiment of the invention. The screen presentation process 100 identifies 102 a display screen to be displayed. The display screen can pertain to a graphical user interface to be presented on a display device of an electronic device. The electronic device can, for example, pertain to a portable electronic device such as a digital media player or a multi-function electronic device that supports media playback.

A decision 104 determines whether the display screen that has been identified 102 has multiple panes. A display screen having multiple panes effectively divides it screen area into different sections, portions, regions or areas. In one embodiment. A display screen that has two panes can be referred to as a split screen since the screen area is split into two panes. When the decision 104 determines that the display screen does not have multiple panes, the display screen can be presented 106 without use of multiple panes.

On the other hand, when the decision 104 determines that the display screen does have multiple panes, a configuration for the multiple panes is determined 108. The determination 108 of the configuration for the multiple panes can be predetermined or dynamically determined. The configuration can, for example, be programmatically predetermined or predetermined based on attributes associated with the display screen or user settings. The configuration can, for example, be dynamically determined based on one or more of the particular display screen (e.g., attributes associated with the display screen), position of the display screen within a hierarchical menu system, the type of information being presented in the display screen, user settings, user input, etc. As an example, the configuration for the multiple panes can utilize one of various layouts. The layouts can size and position the panes differently. For example, the display screen can be segregated into a pair of equally sized panes, or the display screen can be segregated into disproportionately sized panes. In one implementation, one pane can utilize three-fourths of the display screen area while the other pane can utilize one-fourth of the display screen area. In another implementation, one pane can utilize two-thirds of the display screen area while the other pane can utilize one-third of the display screen area.

After the configuration for the multiple panes of the display screen have been determined 108, selectable menu items can be displayed 110 in a first pane of the display screen. Further, contextually relevant information can be displayed 112 in a second pane of the display screen. In one implementation, the information being displayed 112 in the second pane of the display screen can be generally contextually relevant to one or more of the menu items in the first pane. In another implementation, the information being displayed 112 in the second pane of the display screen can be specifically contextually relevant to an identified one of the media items being displayed in the first pane. Following the block 106 or 112, the screen presentation process 100 ends.

Figure 2:
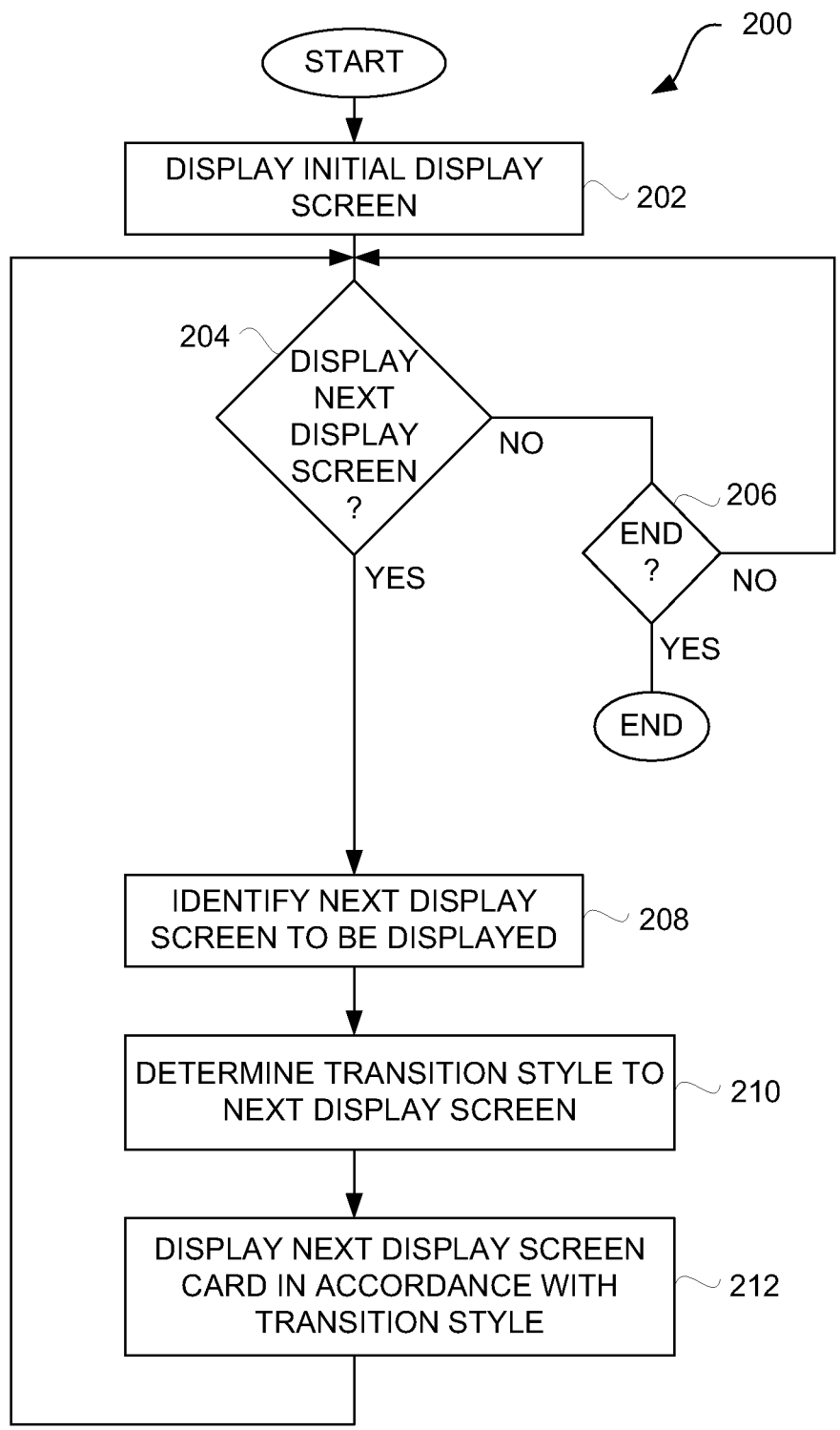
FIG. 2 is a flow diagram of a screen transition process according to one embodiment of the invention.

FIG. 2 is a flow diagram of a screen transition process 200 according to one embodiment of the invention. The screen transition process 200 displays 202 in an initial display screen. As an example, the initial display screen can be displayed 202 on a display device associated with an electronic device, such as a portable electronic device. The initial display screen is a graphical user interface that is displayed on the display device association with the electronic device.

A decision 204 then determines whether a next display screen is to be presented on the display device. The next display screen is also a graphical user interface that is displayed on the display device association with the electronic device. When the decision 204 determines that a next display screen is not to be presented at this time, a decision 206 determines whether the screen transition process 200 should end. When the decision 206 determines that the screen transition process 200 should end, then the screen transition process 200 can end. Alternatively, when the decision 206 determines that the screen transition process 200 should not end, the screen transition process 200 returns to repeat the decision 204 and subsequent blocks.

Once the decision 204 determines that a next display screen should be displayed, a next display screen to be displayed is identified 208. A transition style to the next display screen can also be determined 210. The transition style can be specified by the next display screen can be predetermined, such as through preprogramming. Alternatively, the transition style can be dynamically determined by examination of the type of initial display screen and the type of next display screen. Thereafter, the next display screen is displayed 212 in accordance with the transition style. Following the block 212, the screen transition process 200 returns to repeat the decision 204 and subsequent blocks so that yet another next display screen can be similarly processed.

By transitioning through various display screens, a user of the electronic device is able to navigate a hierarchical menu system. The transitions that are determined and utilized serve to enhance the user experience with respect to interaction with the graphical user interface. The transitions can use animation or other visual effects. One example of a transition is a cross-fade, where one display screen fades out while another fades in. Another example of a transition is where one display screen is pushed off while another display screen is pushed on. In some cases the transition is applied to only a portion (e.g., pane) of a display screen.

The display screens discussed above can, in one embodiment, be implemented as a hierarchy of cards. A card refers to a particular instance of a display screen in which the information is organized in a predetermined layout. A card can include static content and/or dynamic content.

Figure 3:
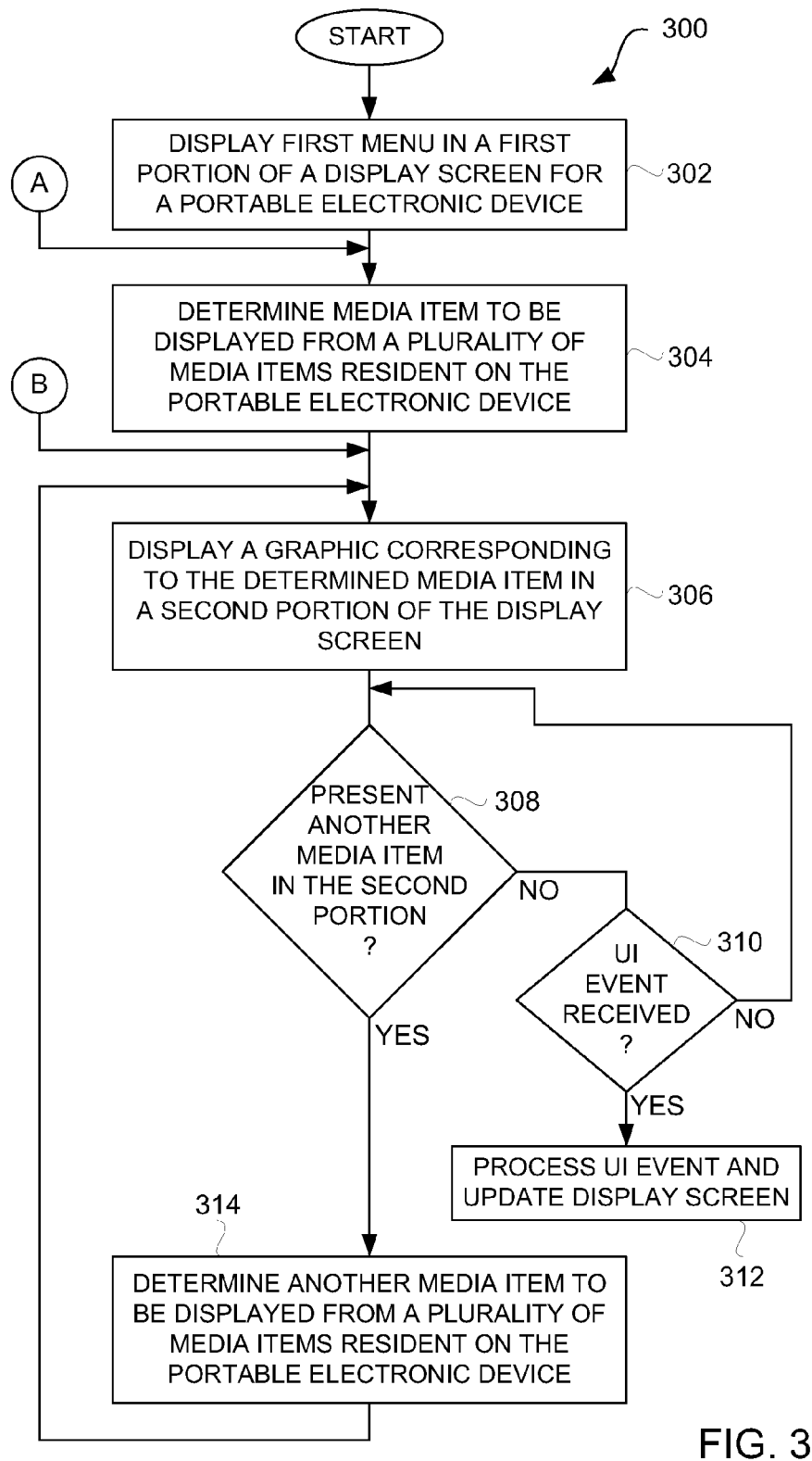
FIG. 3 is a flow diagram of a media item presentation process according to one embodiment of the invention.

FIG. 3 is a flow diagram of a media item presentation process 300 according to one embodiment of the invention. The media item presentation process 300 can display 302 a first menu in a first portion of a display screen for a portable electronic device. The display screen is a graphical user interface that is displayed on a display (display device) of the portable electronic device. A portion of a display screen can, for example, pertains to a pane or window within the display screen.

Next, a media item to be displayed can be determined 304 from a plurality of media items resident on the portable electronic device. A graphical image corresponding to the determined media item can then be displayed 306 in a second portion of the display screen. Here, the graphical image is displayed 306 in the second portion of the display screen while the first menu is being displayed 302 in the first portion of the display screen.

A decision 308 can determine whether another media item is to be presented in the second portion. When the decision 308 determines that another media item is not yet to be presented in the second portion, a decision 310 can determine whether a user interface (UI) event has been received. When the decision 310 determines that a UI event has been received, the UI event can be processed 312 so that the display screen can be accordingly updated. Alternatively, when the decision 310 determines that a UI event has not been received, then the media item presentation process 300 can return to repeat the block 308.

Once the decision 308 determines that another media item is to be presented in the second portion, another media item to be displayed is determined 314 from a plurality of media items resident on the portable media device. Following the block 314, the media item presentation process 300 can return to repeat the block 306 so that a graphic corresponding to the newly determined media item can be displayed in the second portion of the display screen.

Hence, according to one embodiment, the media item presentation process 300 can automatically operate to periodically change the graphical image being displayed in the second portion of the display screen. Although the graphical image can be periodically changed, the display of the first menu can remain until user selection causes navigation to another menu or other media information.

Additionally, according to one embodiment, as the graphical image being displayed in the second portion of the display screen changes from one graphical image to another, transition effects can be utilized to improve the user experience. For example, a cross-fade effect can be utilized to transition from display of an earlier graphical image to display of a new graphical image.

Also, in another embodiment, while displaying a graphical image, various effects can be utilized to provide an improved user experience. For example, the graphical image being displayed can be panned, rotated, skewed, compressed, clipped, etc. while being displayed within the second portion of the display screen. For example, in one embodiment, the second portion of the display screen is often smaller than the size of the graphical image. In such case, panning, rotating, skewing, compressing, or clipping or the like can serve to make the graphical image more exposed to the user even though the size of the second portion is limited. Clipping can, for example, clip ends or edges of a graphical image so as to better fit (i.e., correlate) within the second portion. Compressing can, for example, be non-linear across the graphical image, such as ends or edges can be compressed more that central portions. In one implementation, the panning, rotating, skewing, compressing, or clipping of the graphical image being displayed in the second portion can be automatically performed (i.e., without user interaction) by the portable electronic device. For example, by dynamically changing the panning, rotating, skewing, compressing, or clipping of the graphical image, the graphical image can appear to be animated or undergoing movement to expose different portions of the graphical image.

Figure 4:
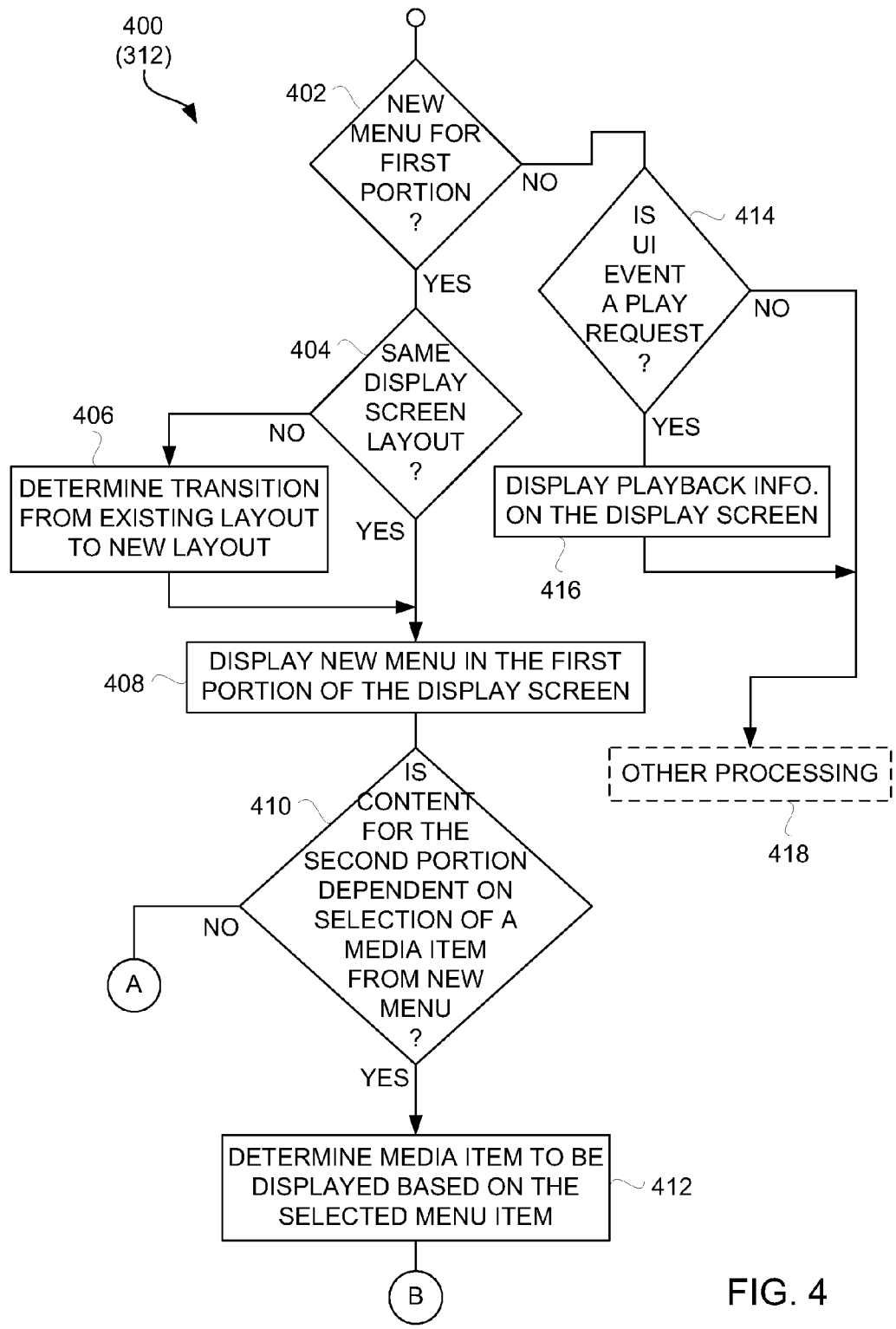
FIG. 4 is a flow diagram of a UI event process according to one embodiment of the invention.

FIG. 4 is a flow diagram of a UI event process 400 according to one embodiment of the invention. The UI event process 400 is, for example, processing suitable for use in the block 312 of the media item presentation process 300 illustrated in FIG. 3.

The UI event process can begin with a decision 402 that determines whether a new menu for a first portion is to be displayed. When the decision 402 determines that a new menu is to be displayed, a decision 404 can determine whether the new menu has the same screen layout as the current menu. When the decision 404 determines that the display screen layout is not the same, then a transition from the existing layout to the new layout can be determined 406. Following the block 406, or directly following the decision 404 when the display screen layout is the same, a new menu can be displayed 408 in the first portion of the display screen. In a case in which a transition has been determined 406, the display 408 of the new menu will transition from the old menu in the old layout to the new menu in the new layout in accordance with the determined transition.

A decision 410 can then determine whether the content for the second portion of the display screen is dependent on selection of a media item from the new menu. When the decision 410 determines that the content for the second portion is dependent on a selection of the media items from the new menu. A media item to be displayed can be determined 412 based on the selected menu item. For example, if the selected menu item is a media collection, such as an album, that has album artwork (e.g., cover art) associated therewith, then the album artwork can be determined as the content to be displayed in the second portion of the display screen. Following the block 412, the UI event process 400 has transitioned to display of the new menu in the first portion of the display screen and has identified content to be displayed in the second portion of the display screen. Hence, following the block 412, the UI event process 400 can return to the block 306 of the media item presentation process 300 to display a graphical image corresponding to the determined content in the second portion of the display screen.

On the other hand, when the decision 410 of the UI event process 400 determines that content for the second portion of the display screen is not dependent on selection of a media item from the new menu, then the UI event process 400 can transition to the block 304 of the media item presentation process 300 where the media item to be next displayed can be determined from the plurality of media items resident on the portable electronic device.

When the decision 402 determines that a new menu is not to be displayed, a decision 414 can determine whether the UI event is a play request. When the decision 414 determines that the UI event is a play request, then playback information can be displayed 416 on the display screen. Following the block 416, or following the decision 414 when the UI event is not a play request, other processing 418 can be performed. The other processing 418 can be performed to carry out the other UI events.

FIGS. 5A-5E are exemplary display screens that can be presented according to certain embodiments of the invention. For example, one or more of these exemplary display screens can be presented by the screen presentation process 100 illustrated in FIG. 1, the screen transition process 200 illustrated in FIG. 2, the media item presentation process 300 illustrated in FIG. 3, or any other suitable process.

Figure 5A:
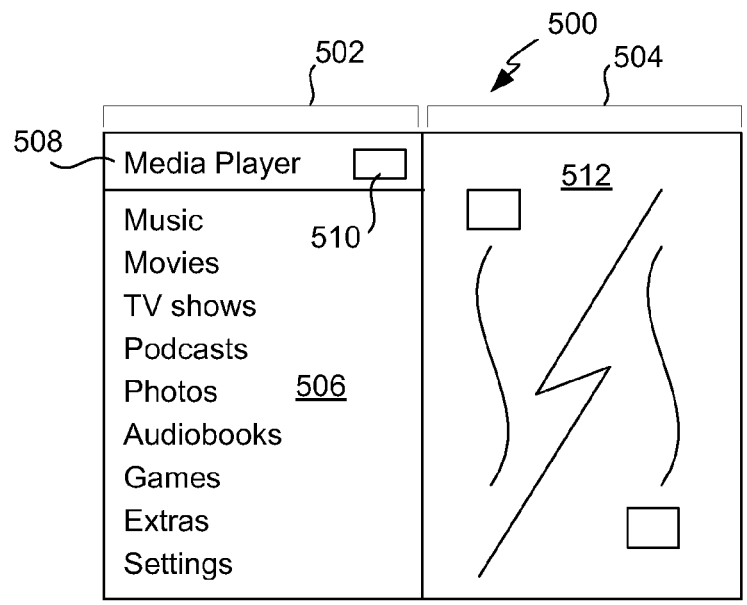
FIGS. 5A-5E are exemplary display screens that can be presented according to certain embodiments of the invention.

FIG. 5A is an exemplary display screen 500 according to one embodiment of the invention. The display screen 500 includes a first portion 502 and a second portion 504. The display screen 500 can also be referred to as a split screen. The first portion 502 includes a menu having a list of selectable items. The first portion 502 can also include a header having a name 508 (e.g., device type, descriptor or name) and a status indicator 510. The name 508 in FIG. 5A is "Media Player" which corresponds to the nature of the portable electronic device or application software utilizing the display screen 500. The status indicator 510 can represent any status condition associated with the portable electronic device, such as battery status, network availability, alerts (email, calendar, etc.), data storage availability, etc. The second portion 504 can contain and present a graphical image 512. In one embodiment, the display screen 500 is presented on a display of a portable electronic device and the graphical image 512 represents a graphical image stored on the portable electronic device. For example, the graphical image 512 can represent a media collection or media item stored on the portable electronic device.

Figure 5B:
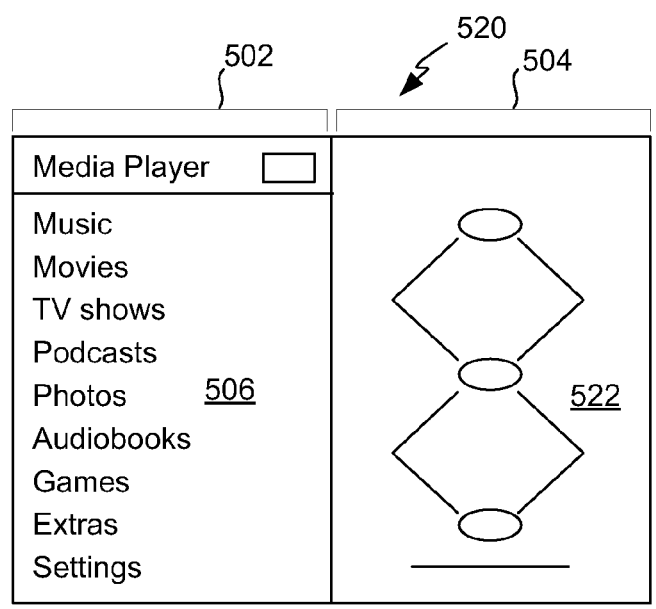

FIG. 5B is an exemplary display screen 520 according to one embodiment of the invention. The display screen 520 is similar to the display screen 500 illustrated in FIG. 5A. However, the second portion 504 of the display screen 520 present a graphical image 522. The graphical image 522 is a different image that is displayed subsequent to the displaying of the graphical image 512 as in FIG. 5A. In one embodiment, the second portion 504 can periodically display a different graphical image. These graphical images can represent digital media assets, such as those digital media assets stored on the portable electronic device.

Figure 5C:
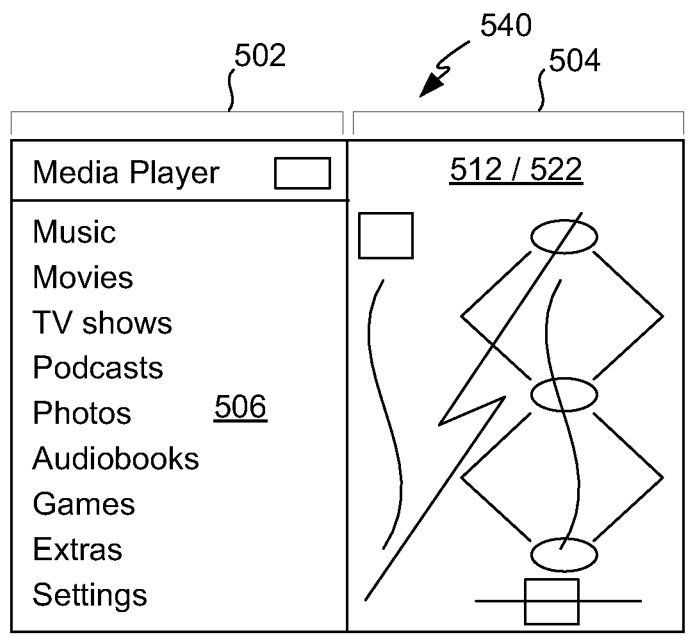

FIG. 5C is an exemplary display screen 540 according to one embodiment of the invention. The display screen 540 represents a transition from the display screen 500 illustrated in FIG. 5A and the display screen 520 illustrated in FIG. 5B. In this regard, the second portion 504 illustrates a transition phase wherein the graphical image 512 is fading out and the graphical image 522 is fading in. Further, in one embodiment, the second portion 504 can transition from the graphical image 512 to the graphical image 522 by sliding the graphical image 512 out of the second portion 504 while sliding the graphical image 522 into the second portion 504. Hence, as illustrated in FIG. 5C, the graphical image 512 has begun to slide out in a right-to-left manner and the graphical image 522 has begun to slide in a right-to-left manner.

Figure 5D:
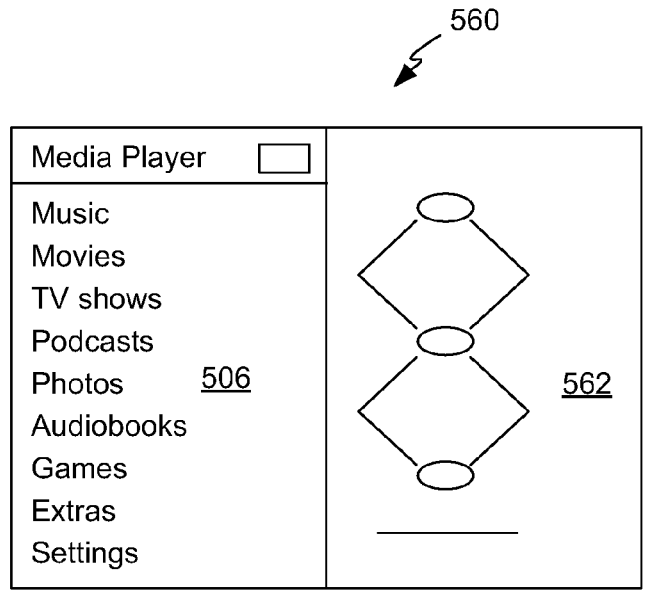

FIG. 5D is an exemplary display screen 560 according to one embodiment of the invention. The display screen 560 represent an animated display of a graphical image 562. For example, the graphical image 562 is the same as the graphical image 522; however, the graphical image 562 is undergoing movement whereas the graphical image 522 can be stationary. The movement applied to the graphical image 562 can server to provide a user friendly animation. For example, the animation can move the graphical image 562 left, right, up and/or down. More generally, the movement can be linear or non-linear. The movement can be advantageous such as when the graphical image 562 has a size that is larger than the second portion 504, whereby the movement can allow more of the graphical image 562 to be visible. Additionally or alternatively, the graphical image 562 can be rotated and/or skewed.

Figure 5E:
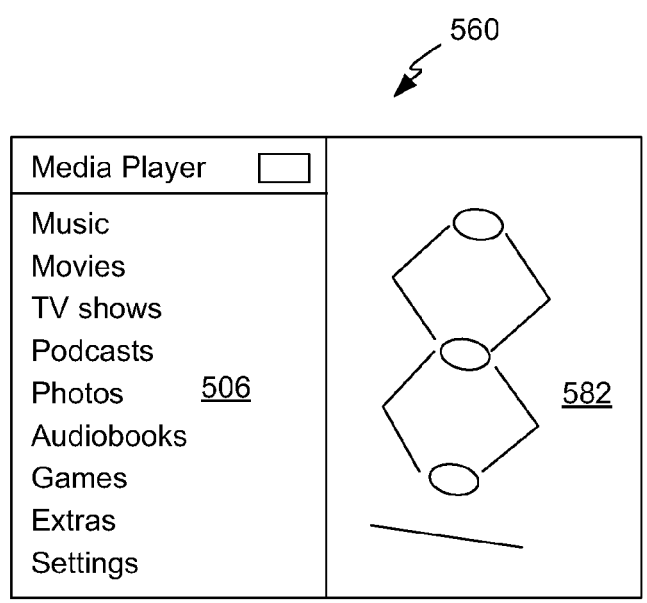

FIG. 5E is an exemplary display screen 580 according to one embodiment of the invention. The display screen 580 represents a graphical image 582 that is a skewed version of the graphical image 522. The skewing of the graphical image 582 causes the image to be displayed with a depth of field. The depth of field can give the graphical image 582 a three-dimensional (3D) appearance although the graphical image 582 is only a two-dimensional (2D) rendering. The skewing can be advantageous such as when the graphical image 522 has a size that is larger than the second portion 504, whereby the skewing can allow more of the graphical image 582 to be visible. Besides skewing the graphical image 582, the graphical image 582 can also be compressed (or compacted) horizontally to enhance the portion of the image that is able to be visible. Since graphical images are able to generally retain their appearance even though some skew or compression has been applied, the graphical image being presented can remain high quality even though some distortion results from the skew or compression.

In FIGS. 5A-5E, the size of the first portion 502 is the same as the size of the second portion 504. However, in some embodiments, the first portion 502 contains the primary user interface components. Hence, in some display screen layouts, the second portion 504 is smaller than the first portion 502. For example, in other layout arrangements, the second portion 504 can be one-third or one-fourth of the total size (e.g., width) of the display screen. In such cases, the movement and/or skewing noted above (e.g., in FIGS. 5D and 5E) can assist in improving the amount of the graphical image that can be presented (i.e., visible) in the second portion 504.

Additionally, it should be noted that in the FIGS. 5A-5E, the first portion 502 includes a header with a name 508 and a status indicator 510. However, in contrast, the second portion 504 does not include such a header. Accordingly, in one embodiment, the second portion 504 is able to maximize it vertical usage of a display by not including a header. With portable electronic devices, the display device (i.e., screen size) is often substantially limited so maximizing vertical usage is advantageous.

FIGS. 6A-6E are exemplary display screens that can be presented according to certain embodiments of the invention. For example, one or more of these exemplary display screens can be presented by the screen presentation process 100 illustrated in FIG. 1, screen transition process 200 illustrated in FIG. 2, media item presentation process 300 illustrated in FIG. 3, or media collection presentation process 700.

Figure 6A:
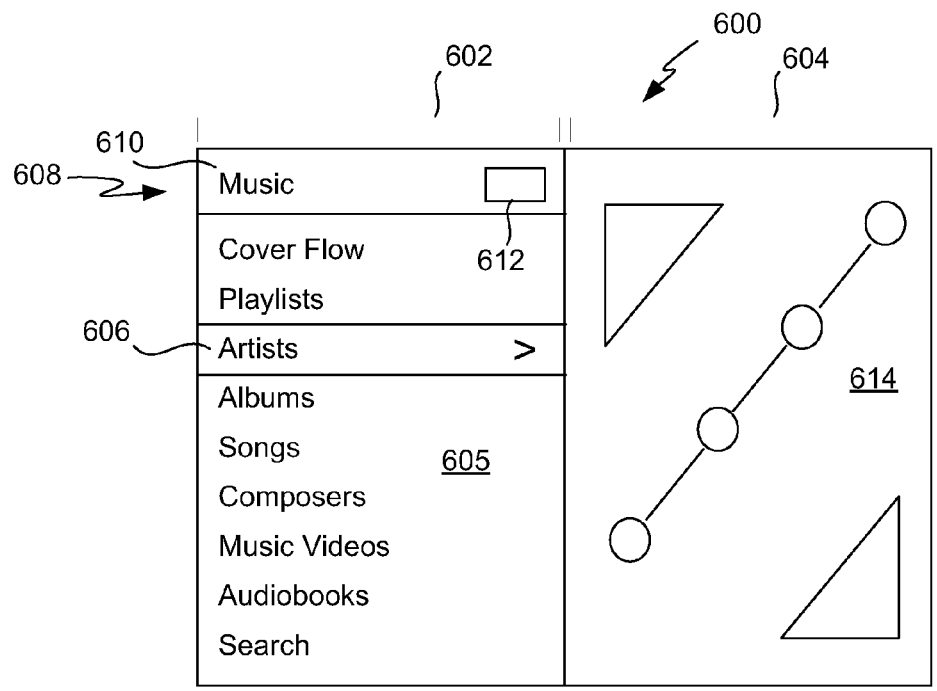
FIGS. 6A-6E are exemplary display screens that can be presented according to certain embodiments of the invention.

FIG. 6A is an exemplary display screen 600 according to one embodiment of the invention. The display screen 600 includes a first portion 602 and a second portion 604. The first portion 602 includes a menu 605 having a list of selectable items. A user can scroll or navigate through the list and cause one of the selectable items to be visually designated 606. The first portion 602 can also include a header 608 that can specify a name 610 for the menu and/or provide status information 612. The second portion 604 can present a graphical image 614. In one embodiment, the graphical image 614 is contextually relevant. In one implementation, the graphical image 614 can pertain to a graphical image that is contextually relevant to the menu 605. For example, as illustrated in FIG. 6A, the menu 604 is denoted "Music" and thus the graphical image 614 can pertain to a music type digital media asset available to the portable electronic device.

Figure 6B:
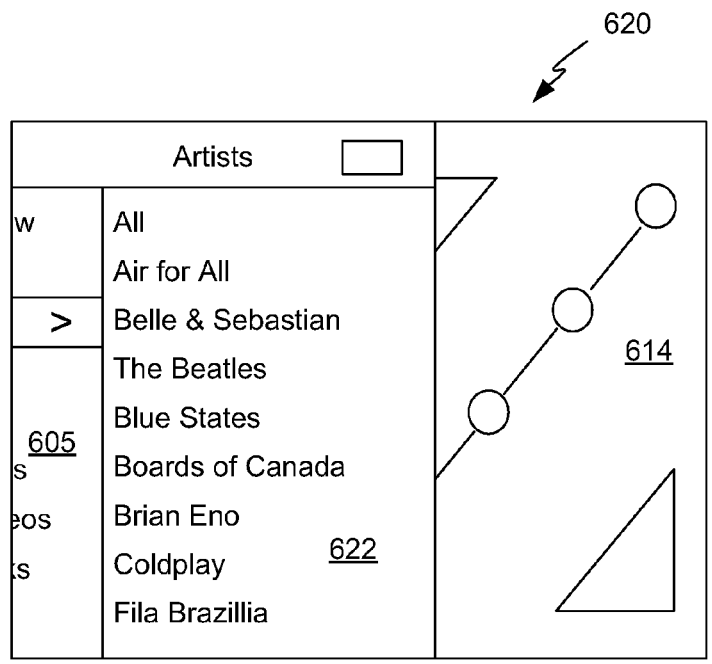
Figure 6C:
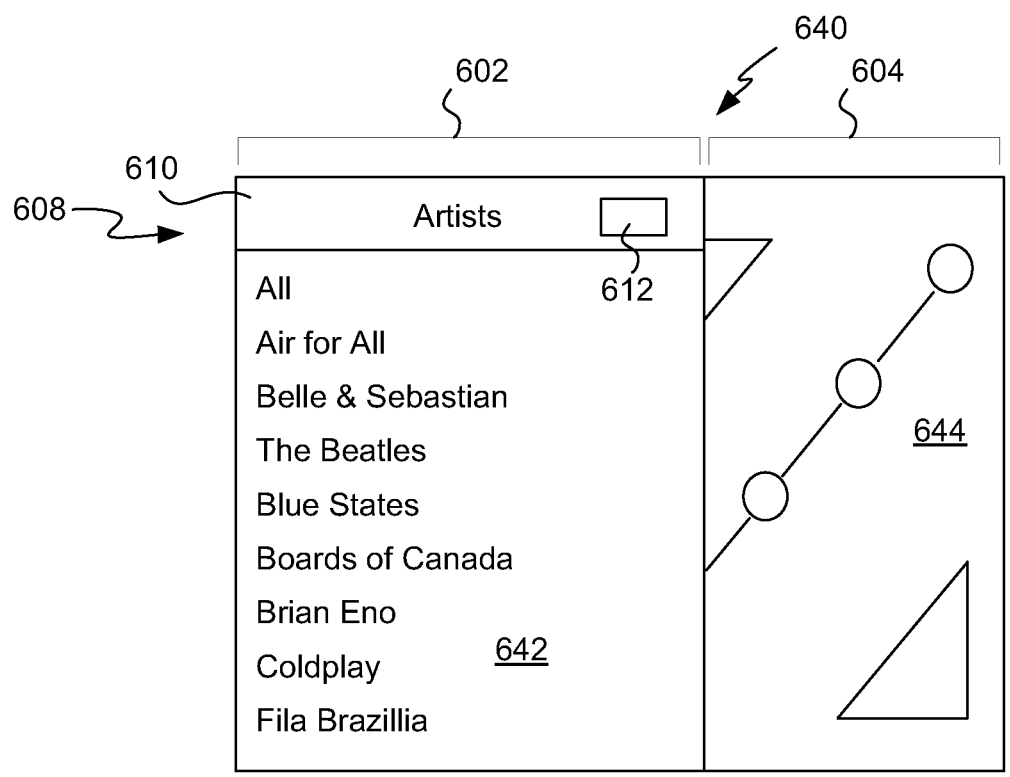

From the exemplary display screen 600, the user of the portable electronic device can, through a user action (e.g., UI event), select the selectable item of the menu 605 that is visually designated 606. In response to such a user selection, another exemplary display screen such as illustrated in FIG. 6C is displayed. FIG. 6B illustrates transition from display of the exemplary display screen 600 (shown in FIG. 6A) to display of another exemplary display screen (shown in FIG. 6C).

FIG. 6B is an exemplary display screen 620 according to one embodiment of the invention. The display screen 620 represents a transition from the display screen 600 to another exemplary display screen (FIG. 6C). The first menu 605 for Music is transitioned to move right-to-left out of the first portion 602, while a new menu 622 is inserted into the first portion 602 right-to-left with respect to the first portion 602. The new menu 622 is an Artists menu that is automatically transitioned from the first menu 605 once the user causes selection of the selectable item of the menu 605 that is visually designated 606 (i.e., Artists). Also, during the transition, the first portion 602 can be enlarged while the second portion 604 reduced. As illustrated in FIG. 6B, since the size of the second portion 604 has been reduced (e.g., in width), less of the graphical image 614 is now able to be displayed in the second portion 604. In this example, a portion of the left side of the graphical image 614 is no longer visible in the display screen 620.

FIG. 6C is an exemplary display screen 640 according to one embodiment of the invention. The display screen 640 includes the first portion 602 and the second portion 604; however, in this embodiment, the first portion 602 is larger than the second portion 604. The first portion 602 includes a menu 642 having a list of selectable items. In this embodiment, the menu 642 pertains to an Artists menu and thus the selectable items pertain to the various Artists that are available for selection. A user can scroll or navigate through the list and cause one of the selectable items to be visually designated. The first portion 602 can also include a header 608 can specify a name 610 (e.g., Artists) for the menu and/or provide status information 612 (e.g., battery or other status). The second portion 604 can present a graphical image 644. In one embodiment, the graphical image 644 is contextually relevant. In one implementation, the graphical image 644 can pertain to a graphical image that is contextually relevant to the menu 642. For example, as illustrated in FIG. 6C, the menu 642 is denoted "Artists" and thus the graphical image 644 can pertain to a music type digital media asset available to the portable electronic device.

Figure 6D:
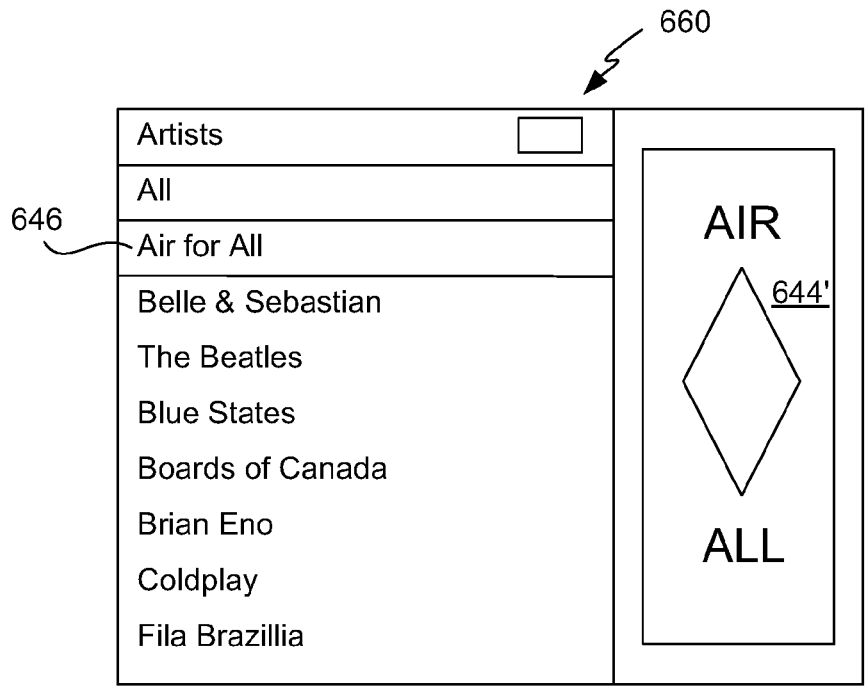

FIG. 6D is an exemplary display screen 660 according to one embodiment of the invention. The display screen 660 in this embodiment is generally similar to the display screen 640 illustrated in FIG. 6C. However, in FIG. 6D, one of the selectable items (i.e., artists) from the menu 642 has been visually designated 646. As a result, the graphical image 644' being displayed in the second portion 604 can be changed to be contextually relevant to the one of the selectable items that has been visually designated 646. For example, the graphical image 644' can pertain to artwork for an album or song of the artist-"Air for All".

Figure 6E:
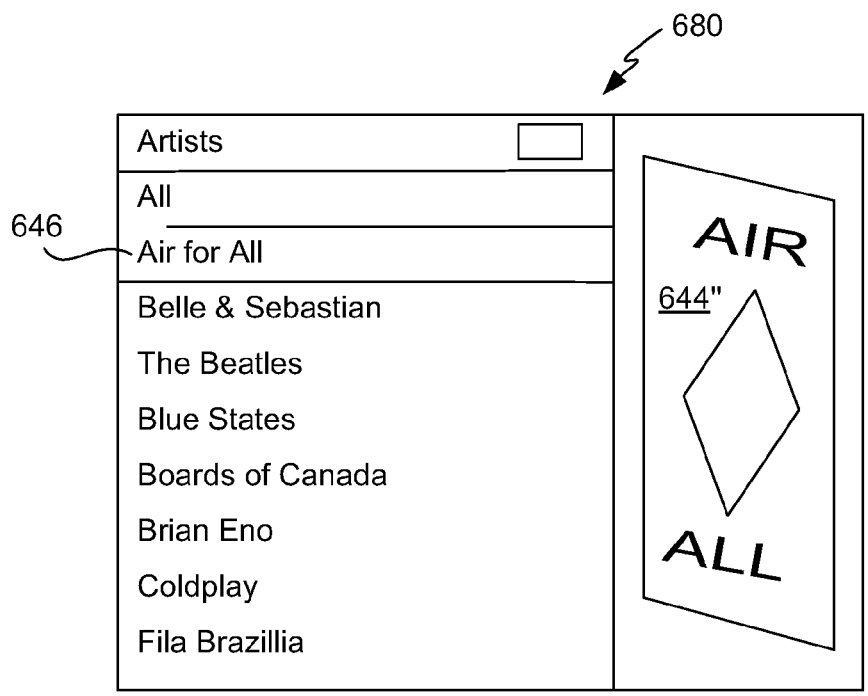

FIG. 6E is an exemplary display screen 680 according to one embodiment of the invention. The display screen 680 in this embodiment is generally similar to the display screen 660 illustrated in FIG. 6D. However, in FIG. 6E, the graphical image 644" is presented in a skewed manner. As illustrated in FIG. 6E, the graphical image 644" has a depth of field that provides a three-dimensional (3D) effect. The degree of skewing or the amount of depth of field being provided to the graphical image 644" can be predetermined, dynamically determined, or user determined. As the user causes another of the selectable item to be visually designated 646, the graphical image 644" can be changed so as to remain contextually relevant to the selectable item that is visually designated 646.

In FIGS. 6A-6E, the size of the second portion 604 has a size that can be the same or smaller than the size of the first portion 602. As examples, in some display screen layouts, the second portion 604 can be one-half, one-third or one-fourth of the total size (e.g., width) of the display screen. In such cases, the movement and/or skewing noted above can assist in improving the amount of the graphical image that can be presented (i.e., visible) in the second portion 604.

Additionally, it should be noted that in the FIGS. 6A-6E, the first portion 602 can include a header 608 with a name 610 and a status indicator 512. However, in contrast, the second portion 604 does not include such a header. Accordingly, in one embodiment, the second portion 604 is able to maximize it vertical usage of a display by not including a header. With portable electronic devices, the display device (i.e., screen size) is often substantially limited so maximizing vertical usage is advantageous.

Figure 7:
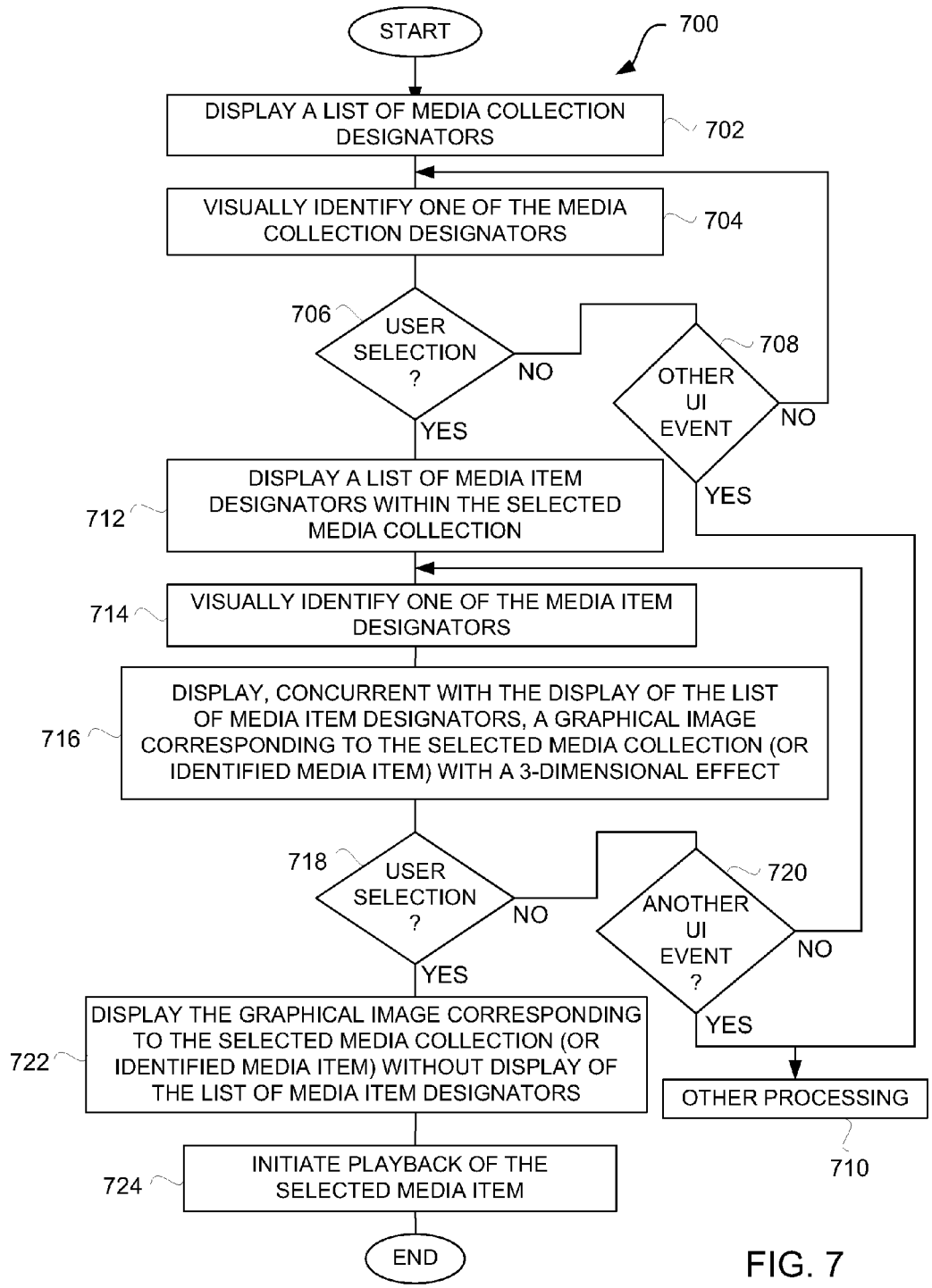
FIG. 7 is a flow diagram of a media collection presentation process according to one embodiment of the invention.

FIG. 7 is a flow diagram of a media collection presentation process 700 according to one embodiment of the invention. The media collection presentation process 700 is, for example, performed by a portable electronic device having a display device that can display various display screens when being operated.

The media collection presentation process 700 can display 702 a list of media collection designators. A media collection is a group of media items, such as an album, playlist and the like. The media collection designators are textual and/or graphic designators for the media collections. For example, a media collection designator can be a name for the collection and/or a graphical image (e.g., icon or thumbnail image) for the collection. One of the media collection designators being displayed can be visibly identified 704. For example, one of the media collection designators can be highlighted.

Next, a decision 706 can determine whether a user selection has been made with respect to the list of media collection designators being displayed. The user selection, when made, operates to select one of the media collections. When the decision 706 determines that a user selection has not been made, then a decision 708 can determine whether another user interface (UI) event has been requested. When the decision 708 determines that another UI event has been requested, then other processing 710 can be performed to carry out the other UI event. On the other hand, when the decision 708 determines that another UI event has not been received, then the media collection presentation process 700 can return to repeat the blocks 704 and 706 to await a user selection.

Once the decision 706 determines that a user selection has been made from the list of media collection designators, a list of media item designators within the selected media collection can be displayed 712. One of the media item designators being displayed in the list of media item designators can be visually identified 714. In addition, concurrent with the display of the list of media items, a graphic image corresponding to the selected media collection (or identified media item) can be displayed 716 with a three-dimensional effect. The three-dimensional (3D) effect is not an actual 3D rendering of the graphical image but instead a two-dimensional (2D) representation that provides a depth of field presentation. The three-dimensional effect can thus be computationally efficient yet still provides a depth of field presentation.

Next, a decision 718 can determine whether a user selection has been made with respect to the list of media item designators. Here, the user selection of one of the media item designators operates to select a media item. When the decision 718 determines that a user selection has not been received, a decision 720 can determine whether another UI event has been received. When the decision 720 determines that another UI event has been received, the media collection presentation process 700 can perform the other processing 710. On the other hand, when the decision 720 determines that another UI event has not been received, the media collection presentation process 700 can return to repeat the blocks 714 and 716 until a user selection has been received.

When the decision 718 determines that a user selection has been received, the graphical image corresponding to the selected media collection can be displayed 722 without display of the list of media item designators. For example, the graphical image corresponding to the selected media collection can be displayed 722 using the full screen area of the display screen. Further, playback of the selected media item can be initiated 724. The graphical image corresponding to the selected media collection can remain displayed 722 while the playback of the selected media item is on-going. In one embodiment, the graphical image can be manipulated during at least a portion of the playback 724. For example, the graphical image can be automatically rotated, skewed, panned or oscillated just prior to or during at least a portion of the playback. Following the playback of the selected media item, the media collection presentation process 700 can end.

FIGS. 8A-8D are exemplary display screens that can be presented according to certain embodiments of the invention. For example, one or more of these exemplary display screens can be presented by the screen presentation process 100 illustrated in FIG. 1, screen transition process 200 illustrated in FIG. 2, media item presentation process 300 illustrated in FIG. 3, media collection presentation process 700, or another suitable process. However, these exemplary display screens are particular well suited for presentation by the media collection presentation process 700.

Figure 8A:
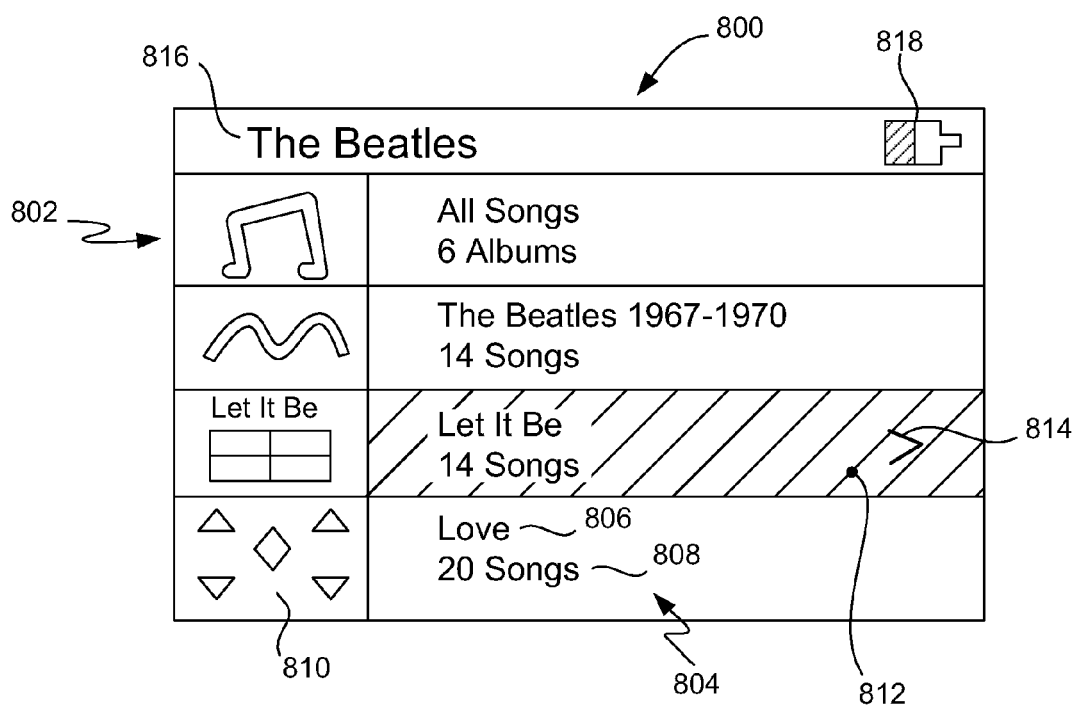
FIGS. 8A-8D are exemplary display screens that can be presented according to certain embodiments of the invention.

FIG. 8A is an exemplary display screen 800 that presents list 802 of media collection designators according to one embodiment of the invention. The list 802 in this example includes designators for four different media collections. The designators for each media collection include textual descriptors 804 including a name 806 and a number of media items 808 (e.g., songs) within the associated media collection. The designators for each media collection can also include graphical descriptors 810. The graphical descriptors 810 are, for example, graphical images associated with the associated media collection. For example, if the media collections are albums, the graphical images can be album artwork. As illustrated in FIG. 8A, an identified media collection designator 812 within the list 802 is visually distinguished from the other media collection designators within the list 802. For example, the visual designation can be visually highlighting the corresponding media collection designator. An identification identifier 814 can be displayed with the identified media collection designator 812 to signal the user that the identified media collection designator 812 can be selected. The exemplary display screen 800 can also include a collection category 816 (e.g., artist) and a status indicator 818. In this example, the collection category 816 pertains to an artist (e.g., "The Beatles"), and the status indicator 818 reflects battery status. Alternatively, the status indicator 818 can represent any status condition association with the portable electronic device, such as network availability, alerts (email, calendar, etc.), data storage availability, etc.

Figure 8B:
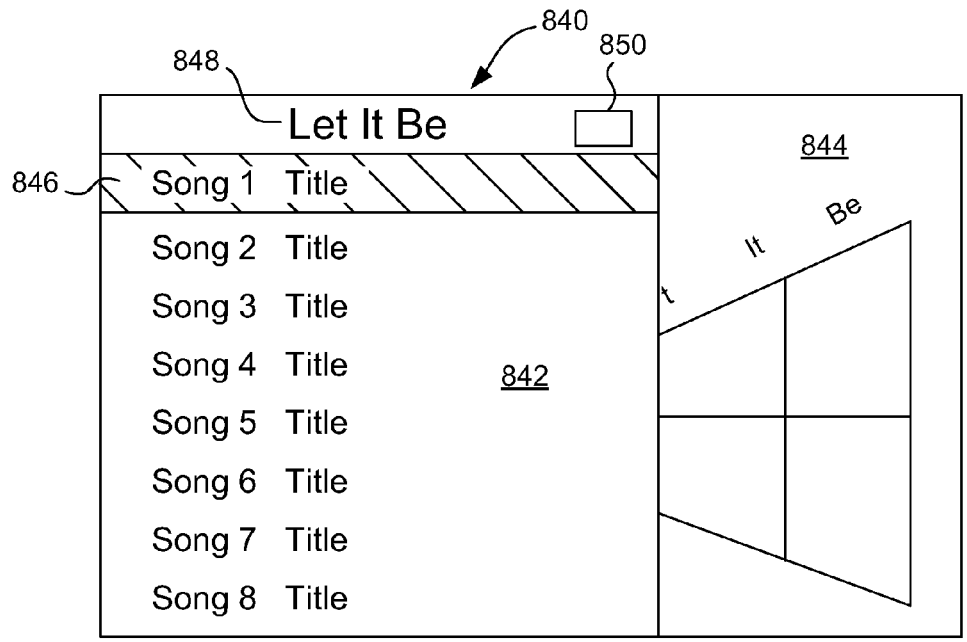

FIG. 8B is an exemplary display screen 840 that presents a list 842 of media item designators and a graphical image 844 that is contextually relevant according to one embodiment of the invention. As illustrated in FIG. 8B, within the list 842 one of the media item designators 846 is visually distinguished from the other media item designators within the list 842. For example, the visual designation can be visually highlighting of the corresponding media item designator. The exemplary display screen 840 can also include a media collection designator 848 (e.g., name) and a status indicator 850. In this example, the media collection designator 848 pertains to a label or name (e.g., "Let It Be") for a particular media collection, and the status indicator 850 reflects battery status. Alternatively, the status indicator 850 can represent any status condition association with the portable electronic device, such as network availability, alerts (email, calendar, etc.), data storage availability, etc. In effect, the display screen 840 has two portions (e.g., two panes or split screen). The first portion includes the list 842 along with the media collection designator 848 and the status indicator 850. The first portion can also be referred to as a card. The second portion includes the graphical image 844. In one embodiment, and as illustrated in FIG. 8B, the graphical image 844 can be displayed in a skewed manner. By skewing the graphical image 844, the graphical image 844 is provided with a depth of field whereby the left side of the image appears to be set back into the display. The skewing also allows the graphical image 844 to be compacted to fit more of its image within the limited area of the second portion.

Figure 8C:
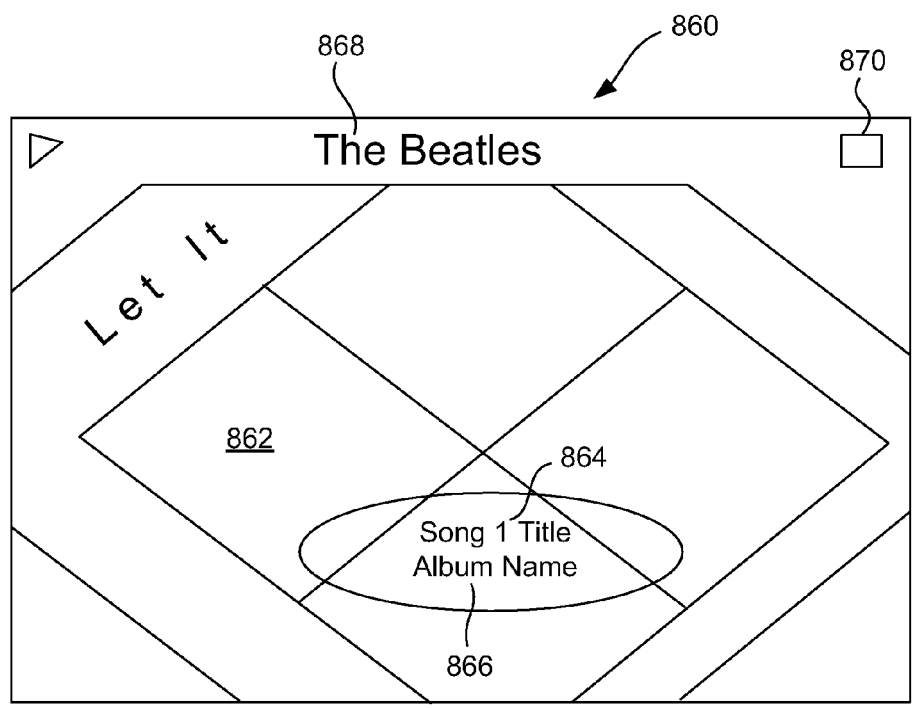

FIG. 8C is an exemplary display screen 860 of a graphical image during playback of a selected media item according to one embodiment of the invention. The display screen 860 displays a graphical image 862 for a particular media item (e.g., "Song 1"). The display screen 860 also displays a title 864 for the particular media item and a media collection name 866 (e.g., album name). The exemplary display screen 860 can also include an artist designator 868 and a status indicator 870. In this example, the artist designator 868 pertains to an artist name (e.g., "The Beatles") associated with the particular media item, and the status indicator 870 reflects battery status. Alternatively, the status indicator 870 can represent any status condition association with the portable electronic device, such as network availability, alerts (email, calendar, etc.), data storage availability, etc. In one embodiment, the graphical image 862 can be displayed in a rotated or skewed fashion. As illustrated in FIG. 8C, the graphical image 862 is displayed at an angle and the entire graphical image is not visible on the display.

In one implementation, the exemplary display screen 840 illustrated in FIG. 8B can represent a display screen that is presented following selection of a media collection (e.g., "Let It Be") from the exemplary display screen 800 illustrated in FIG. 8A. In one implementation, the exemplary display screen 860 illustrated in FIG. 8C can represent a display screen that is presented following selection of a media item ("Song 1") from the exemplary display screen 840 illustrated in FIG. 8B. The exemplary display screen 840 has a two portion (or a split screen) layout, while the exemplary display screens 800 and 860 have single portion layouts. The exemplary display screen 800 has a list or menu layout, while the exemplary display screen has a playback layout.

Figure 8D:
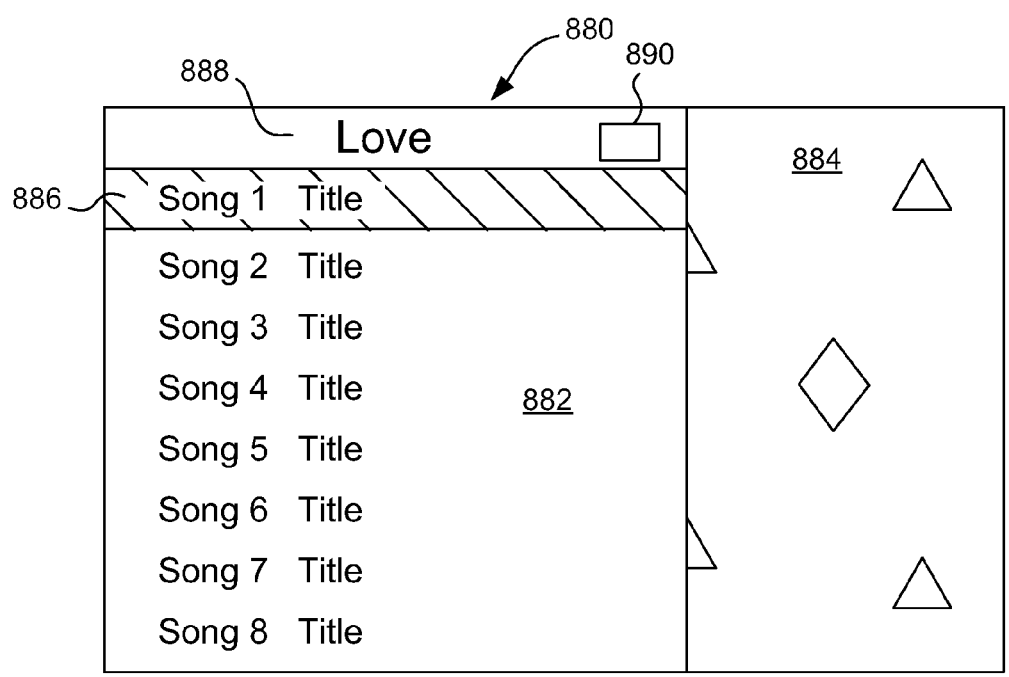

FIG. 8D is an exemplary display screen 880 that presents a list 882 of media item designators and a graphical image 884 that is contextually relevant according to one embodiment of the invention. Here, in one example, the exemplary display screen 880 can follow from the exemplary display screen 840 in response to a user input (e.g., UI event to display a next media collection). The next media collection is shown in the list 802 of media collections illustrated by the exemplary display screen 800 of FIG. 8A. As illustrated in FIG. 8D, within the list 882 one of the media item designators 886 is visually distinguished from the other media item designators within the list 882. For example, the visual designation can be visually highlighting of the corresponding media item designator. The exemplary display screen 880 can also include a media collection designator 888 (e.g., name) and a status indicator 890. In this example, the media collection designator 888 pertains to a label or name (e.g., "Love") for a particular media collection, and the status indicator 890 reflects battery status. Alternatively, the status indicator 850 can represent any status condition association with the portable electronic device, such as network availability, alerts (email, calendar, etc.), data storage availability, etc. In effect, the display screen 880 has two portions (e.g., two panes or split screen). The first portion includes the list 882 along with the media collection designator 888 and the status indicator 890. The first portion can also be referred to as a card. The second portion includes the graphical image 884. In one embodiment, and as illustrated in FIG. 8D, the graphical image 884 can be displayed in a skewed manner. By skewing the graphical image 884, the graphical image 884 is provided with a depth of field whereby the left side of the image appears to be set back into the display. The skewing also allows the graphical image 884 to be compacted to fit more of its image within the limited area of the second portion.

In various embodiments, implementations or examples discussed above, a display screen can have two portions (or a split screen) layout. In one embodiment, one of the portions can display data in a skewed manner. In another embodiment, two of the portions can display data in a skewed manner. The skewing imposed on one portion can be the opposite of skewing imposed on another portion. For example, a display screen having two portions that are both skewed could be useful for virtual flipping through photos or album artwork. In general, in a display screen having two or more portions, any one or more of the portions can be skewed An electronic device having a display screen often has a plurality of different display screens available for display. For example, a user can interact with the electronic device to navigate through a hierarchy of display screens to access data (e.g., information or media playback) on the electronic device.

Display screens can also be referred to as graphical user interfaces. The graphical user interfaces are presented on a display of an electronic device. For example, the electronic device can be a mobile computing device, such as a handheld device (e.g., mobile telephone, portable media player, personal digital assistant).

According to one embodiment of the invention a display screen having multiple panes can adjust the respective sizes of the panes depending on user interaction. In one implementation, if a user interacts with a first pane, the first pane can be enlarged and a second pane can be reduced. For example, if a user identifies an item in a particular pane, then the particular pane can enlarge to provide a greater area for visual presentation of at least the identified item. Here, in one approach, the particular pane can always enlarge or the particular pane can enlarge only if advantageous for the visual presentation of at least the identified item. When the multiple panes are transitioning to different sizes one or more transition effects (e.g., animation, cross-fade, kens burn effect, etc.) can be used.

Figure 9A:
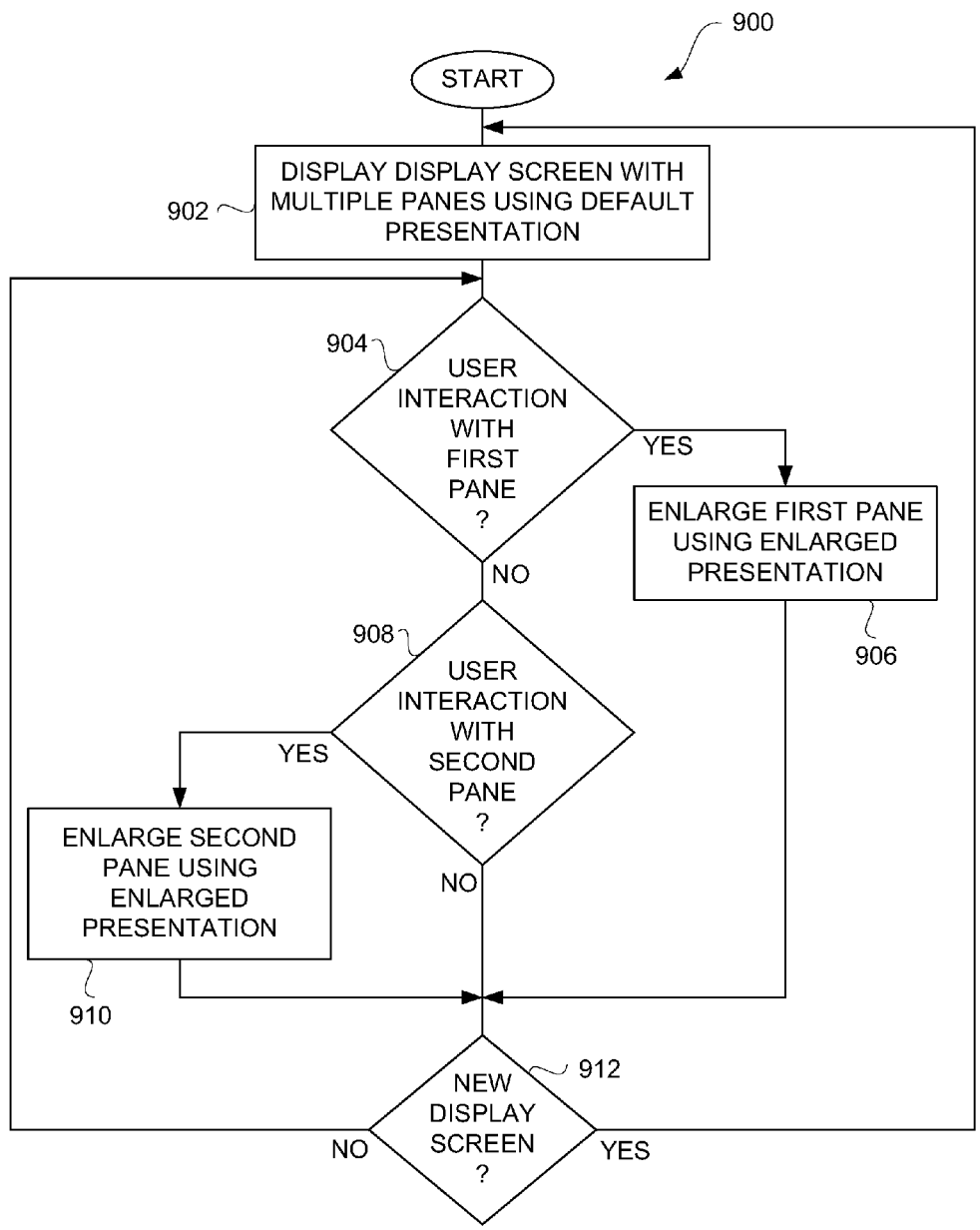
FIG. 9A is a flow diagram of a display screen presentation process according to one embodiment of the invention.

FIG. 9A is a flow diagram of a display screen presentation process 900 according to one embodiment of the invention. The display screen presentation process 900 is, for example, performed by an electronic device having a display. The display screen presentation process 900 operates to display a display screen on the display of the electronic device. The display screen is responsive to user interaction to alter or change its presentation format.

The display screen presentation process 900 can initially display 902 a display screen with multiple panes using a default presentation. A presentation is used to display a display screen. In the case of a multi-pane display screen, the default presentation can specify the attributes (e.g., size) for the multiple panes of the display screen. For example, the default presentation could be associated with a display screen having first and second panes of the same size.

Next, a decision 904 can determine whether a user interaction with respect to the first pane has been received. The first pane can display first data, and the second pane can display second data. The data being displayed can vary but may include graphic (including images) and/or text (including lists, menus or information). A user interaction with respect to the first pane can be an identification or selection of some portion of the first data being displayed. When the decision 904 determines that a user interaction with respect to the first pane has been received, the first pane of the display screen can enlarge 906 using an enlarged presentation. Here, the enlarged presentation operates to enlarge the display area for at least a portion of the first pane. Typically, when the first pane is enlarged, the second pane is reduced such that the total screen display area is constant.

On the other hand, when the decision 904 determines that a user interaction with respect to the first pane has not been received, a decision 908 determines whether a user interaction with respect to the second pane has been received. When the decision 908 determines that a user interaction with respect to the second pane has been received, the second pane of the display screen can enlarge 910 using an enlarged presentation. Here, the enlarged presentation operates to enlarge the display area for at least a portion of the second pane. Typically, when the second pane is enlarged, the first pane is reduced such that the total screen display area is constant.

Following the blocks 906 and 910, as well as following the decision 908 when no user interaction with respect to the second pane has been received, a decision 912 can determine whether a new display screen is to be displayed. User interaction can be a selection and cause a subsequent or next display screen to be displayed. For example, often a plurality of display screens are associated with a hierarchical arrangement that facilitates navigation and selection of certain data from a larger set of data. Hence, a user can typically traverse a hierarchical arrangement of display screens by transitioning from one display screen to another. When the decision 912 determines that a new display screen is to be displayed, then the display screen presentation process 900 can return to repeat the block 902 and subsequent blocks for processing with respect to a new display screen. Alternatively, when the decision 912 determines that a new display screen is not to be displayed, then the display screen presentation process 900 returns to repeat the decision 904 and subsequent blocks for continued processing with respect to the current display screen.

One example of the display screen presentation process 900 is where the first data displayed in the first pane is a list (e.g., menu) of selectable items, and the second data displayed in the second pane is data contextually related to at least some portion of the first data. When the user interacts with the first pane to scroll or traverse the list of selectable items and thus identify an item in the list, the first pane can be enlarged so that navigation and viewing of the first pane is easier. Typically, when the first pane is enlarged, the second pane is reduced. Additionally, the second data can dynamically adjust to be contextually relevant to the selected item in the list displayed in the first pane. In this example, the user can also interact with the second pane. Hence, when the user subsequently interacts with the second pane, the second pane can be enlarged so that the second data is easier to view.

Typically, when the second pane is enlarged, the second pane is reduced. Hence, in this example, the pane corresponding to user interaction is enlarged while the other corresponding pane is made smaller.

Figure 9B:
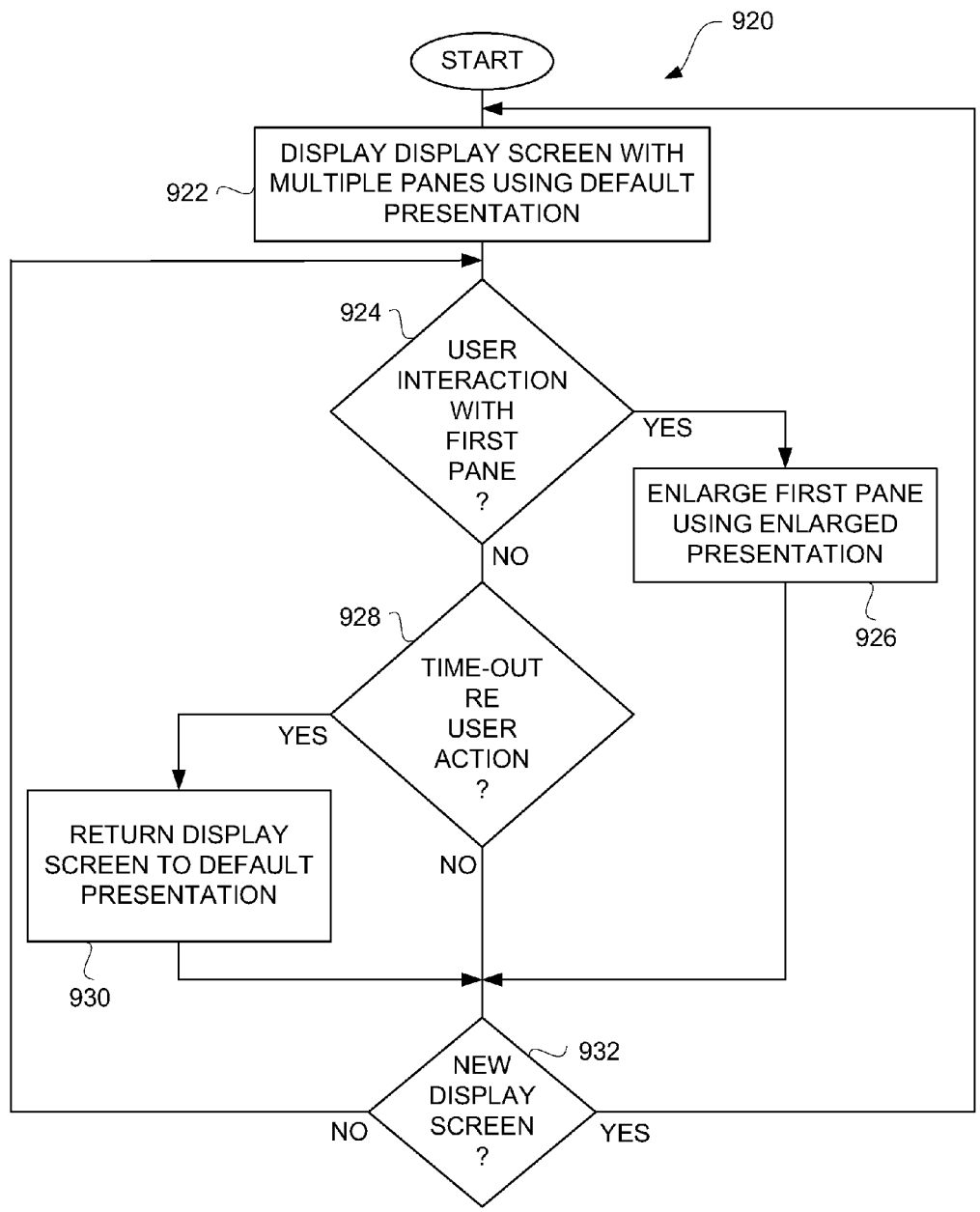
FIG. 9B is a flow diagram of a display screen presentation process according to one embodiment of the invention.

FIG. 9B is a flow diagram of a display screen presentation process 920 according to one embodiment of the invention. The display screen presentation process 920 is, for example, performed by an electronic device having a display. The display screen presentation process 920 operates to display a display screen on the display of the electronic device. The display screen is responsive to user interaction to alter or change its presentation format.

The display screen presentation process 920 can initially display 922 a display screen with multiple panes using a default presentation. A presentation is used to display a display screen. In the case of a multi-pane display screen, the default presentation can specify the attributes (e.g., size) for the multiple panes of the display screen. For example, the default presentation could be associated with a display screen having first and second panes of the same size.

Next, a decision 924 can determine whether a user interaction with respect to the first pane has been received. The first pane can display first data, and the second pane can display second data. The data being displayed can vary but may include graphic (including images) and/or text (including lists, menus or information). A user interaction with respect to the first pane can be an identification or selection of some portion of the first data being displayed. When the decision 924 determines that a user interaction with respect to the first pane has been received, the first pane of the display screen can enlarge 926 using an enlarged presentation. Here, the enlarged presentation operates to enlarge the display area for at least a portion of the first pane. Typically, when the first pane is enlarged, the second pane is reduced such that the total screen display area is constant. When the second pane is reduced, the second data can be modified to better fit within the second pane which has a reduced size. The modification to the second data can include scaling, clipping, distorting or compressing. In one implementation, the second data is dynamically determined based on the user interaction with the first pane. For example, the second data can be contextually related to at least a portion of the first data in the first pane that is identified by the user interaction. It should also be noted that the second pane may not be receptive to any user interaction. When the decision 924 determines that a user interaction with respect to the first pane has not been received, a decision 928 can determine whether a time-out for user action has occurred. When the decision 928 determines that there has been no user interaction with the first pane for a predetermined period of time, then the display screen being displayed can return 930 to again present the display screen using the default presentation.

Following the blocks 926 and 930, as well as following the decision 928 when no user interaction with respect to the second pane has been received, a decision 932 can determine whether a new display screen is to be displayed. User interaction can be a selection and cause a subsequent or next display screen to be displayed. For example, often a plurality of display screens are associated with a hierarchical arrangement that facilitates navigation and selection of certain data from a larger set of data. Hence, a user can typically traverse a hierarchical arrangement of display screens by transitioning from one display screen to another. When the decision 932 determines that a new display screen is to be displayed, then the display screen presentation process 900 can return to repeat the block 922 and subsequent blocks for processing with respect to a new display screen. Alternatively, when the decision 932 determines that a new display screen is not to be displayed, then the display screen presentation process 920 returns to repeat the decision 924 and subsequent blocks for continued processing with respect to the current display screen.

One example of the display screen presentation process 920 is where the first data displayed in the first pane is a list (e.g., menu) of selectable items, and the second data displayed in the second pane is data contextually related to at least some portion of the first data. When the user interacts with the first pane to scroll or traverse the list of selectable items and thus identify an item in the list, the second data dynamically adjusts to be contextually relevant to the selected item in the list displayed in the first pane. Further, when the scrolling or traversing of the list in the first pane is being performed, the first pane is enlarged so that navigation and viewing of the first pane is easier. In some embodiments, after a lack of user interaction with respect to the first pane for more than a predetermined duration, the first pane can automatically return to the default presentation.

Figure 9C:
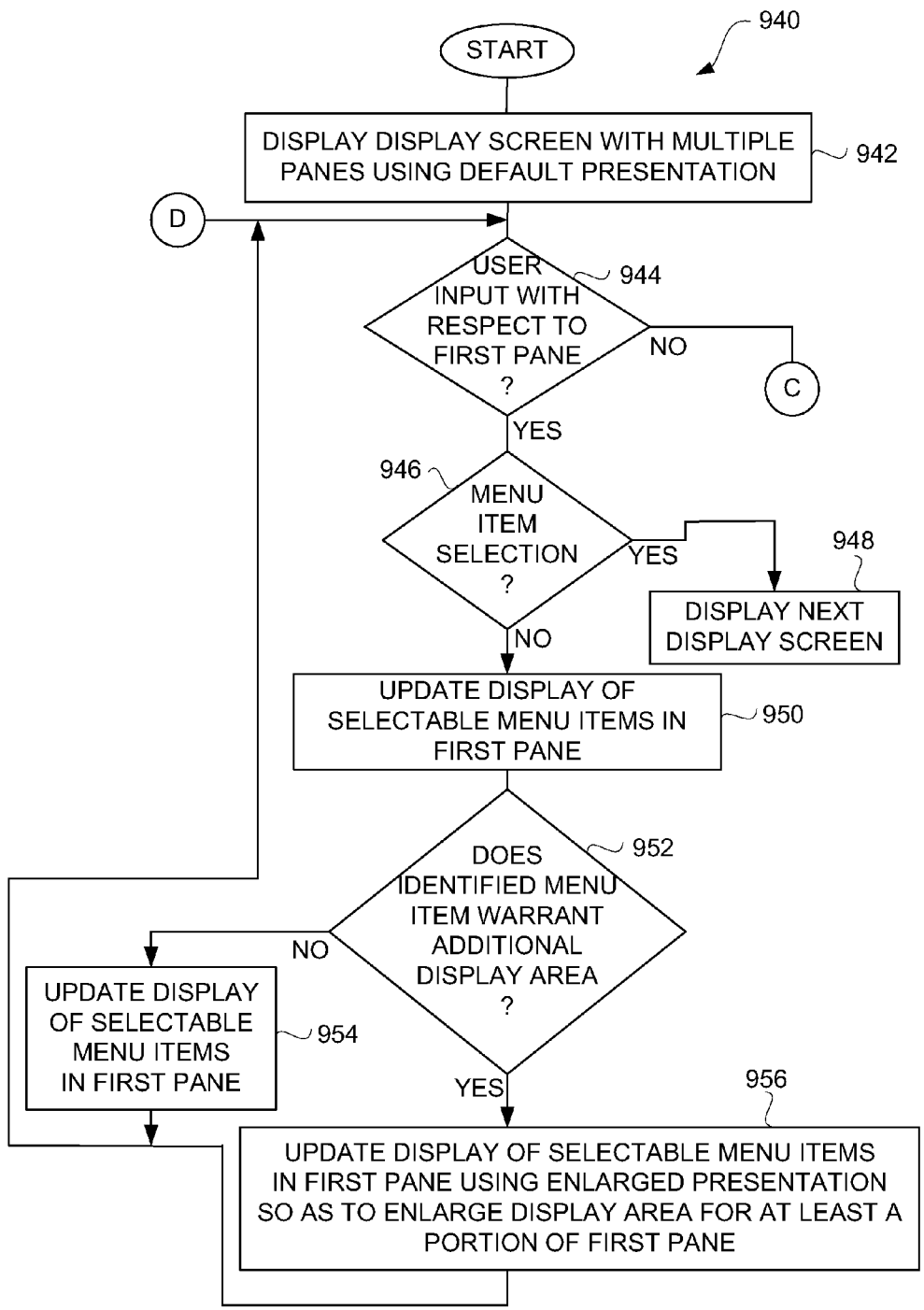
FIGS. 9C and 9D are flow diagrams of a display screen presentation process 940 according to one embodiment of the invention.
Figure 9D:
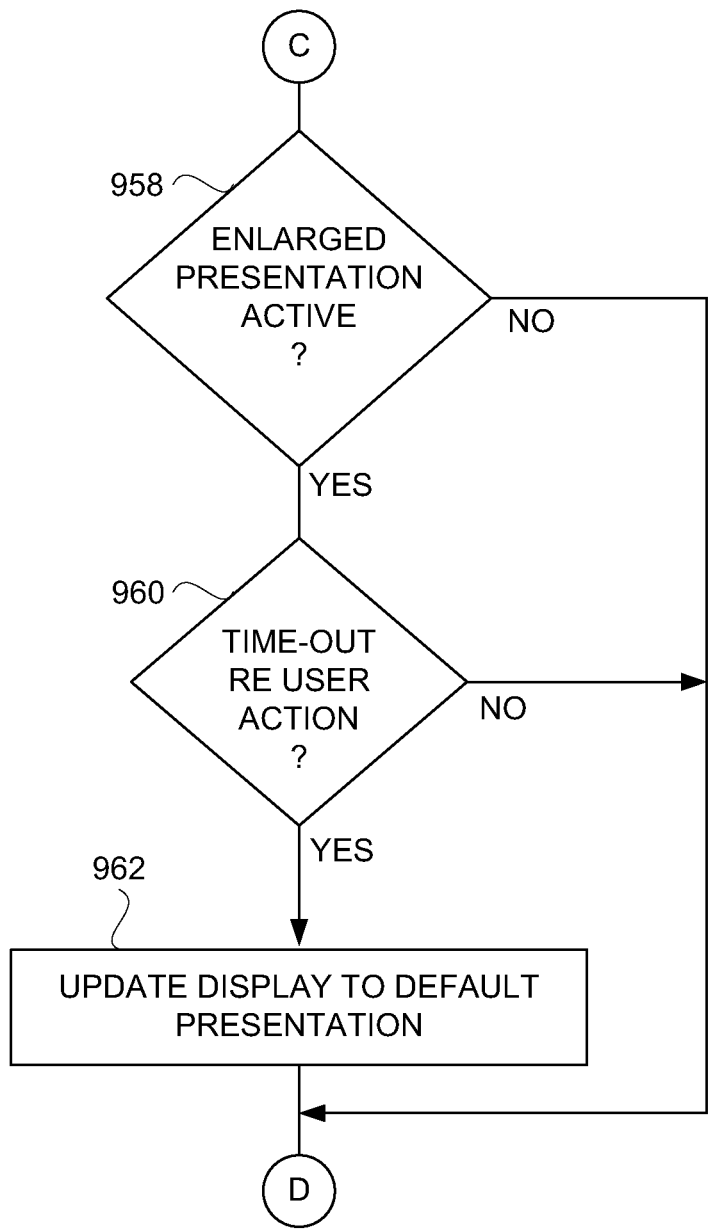

FIGS. 9C and 9D are flow diagrams of a display screen presentation process 940 according to one embodiment of the invention. The display screen presentation process 940 is, for example, performed by an electronic device having a display. The display screen presentation process 940 operates to display a display screen on the display of the electronic device. The display screen is responsive to user interaction to alter or change its presentation.

The display screen presentation process 940 can initially display 942 a display screen with multiple panes using a default presentation. A presentation is used to display a display screen. In the case of a multi-pane display screen, the default presentation can specify the attributes (e.g., size) for the multiple panes of the display screen. For example, the default presentation could be associated with a display screen having first and second panes of the same size.

Next, a decision 944 determines whether a user input with respect to the first pane has been received. It is assumed that the first pane displays a menu having a plurality of selectable items. A user input with respect to the first pane can be a selection of one of the selectable items being displayed in the first pane. When the decision 944 determines that a user input with respect to the first pane has been received, a decision 946 can determine whether the user input corresponds to a menu item selection. For example, the first pane of the display screen can present a plurality of selectable items of a menu. The decision 946 determines whether the user input with respect to the first pane selects one of the selectable items. When the decision 946 determines that a selectable item from the first pane has been selected, a next display screen can be displayed 948. Here, the selection of a selectable item from the first pane can cause a subsequent or next display screen to be displayed 948. For example, often a plurality of display screens are associated with a hierarchical arrangement that facilitates navigation and selection of certain data from a larger set of data. Hence, the user typically traverses the hierarchical arrangement of display screens by transitioning from one display screen to another.

On the other hand, when the decision 946 determines that the user input with respect to the first pane is not a menu item selection, user input is assumed to be a menu item identification from the selectable items of the menu. For example, a menu item can be identified by highlighting the menu item (e.g., via a scrolling action). Hence, in response to the user input, the display of the selectable menu items in the first pane can be updated 950. Next, a decision 952 determines whether the identified menu item warrants additional display area for its presentation. When the decision 952 determines that the identified menu item does not warrant additional display area, the display of selectable menu items in the first pane can be updated 954. By updating 954 the display of the selectable menu items in the first pane, the identified menu item can be distinctively identified. For example, the identified menu item can be distinctively identified by visually highlighting the identified menu item.

On the other hand, when the decision 952 determines that the identified menu item does warrant additional display area, the display of the selectable menu items in the first pane can be updated 956 using an enlarged presentation. The enlarged presentation operates to enlarge the display area for at least a portion of the first pane. As one example, the entire display area for the first pane can be enlarged. As another example, only a portion of the display area associated with the identified menu item can be enlarged. Following the blocks 954 and 956, the display screen presentation process 940 returns to repeat the decision 944 and subsequent blocks so that subsequent user inputs can be similarly processed.

Additionally, when the decision 944 determines that a user input with respect to the first pane has not been received, a decision 958 determines whether an enlarged presentation is active. When the decision 958 determines that an enlarged presentation is active, a decision 960 determines whether a time-out for receiving user action has expired. When the decision 960 determines that a time-out for user action has occurred, then the display is updated 962 to again present the display screen using the default presentation. Further, when the decision 958 determines that the enlarged presentation is not active, or even if active when the decision 960 determines that a time-out for user action has occurred, then the processing performed by the display screen presentation process 940 operates to bypass the block 962. Following the block 962 as well as following the decisions 958 and 960 when the enlarged presentation is not active or when time-out for receiving user action has not occurred, the display screen presentation process 940 can return to repeat the decision 944 and subsequent blocks so that subsequent user inputs can be similarly processed.

Figure 10A:
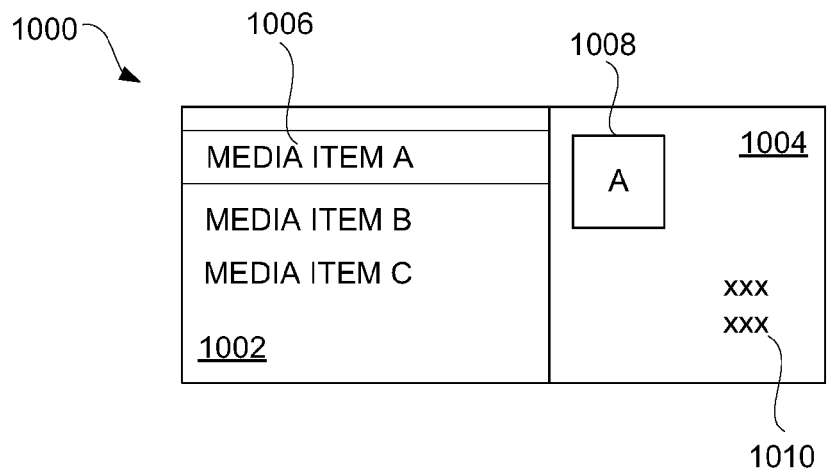
FIGS. 10A-10C are exemplary display screens according to various embodiments of the invention.
Figure 10B:
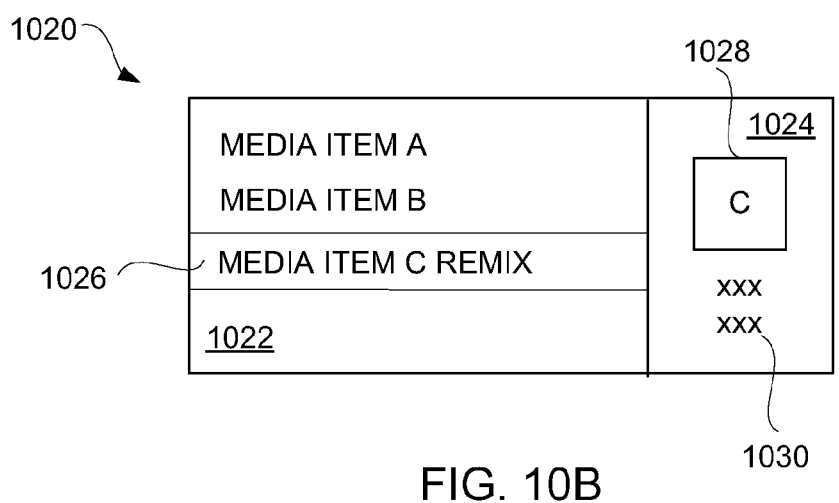
Figure 10C:
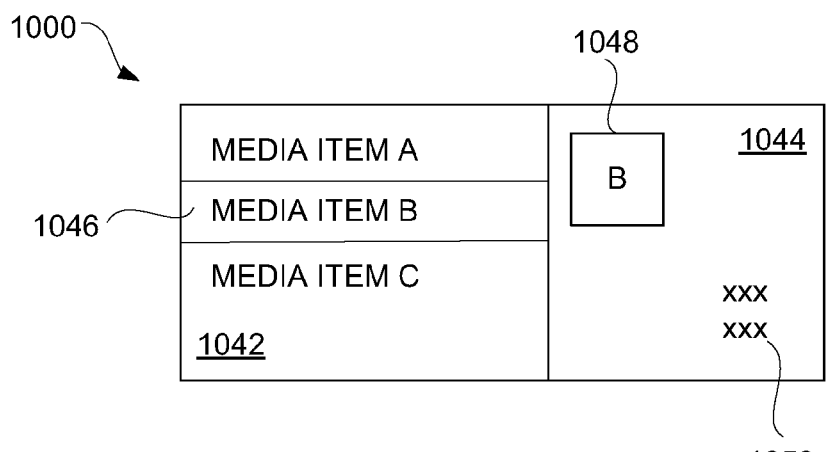

FIGS. 10A-10C are exemplary display screens according to various embodiments of the invention. These display screens have first and second panes that are used to display data. A display screen has a finite amount of area, and the display screen area is allocated between the first and second panes. In one embodiment, at least a portion of one of the panes of a display screen can be dynamically re-sized based on user interaction with respect to data being displayed by the display screen.

FIG. 10A illustrates a display screen 1000 according to one embodiment of the invention. The display screen 1000 includes a first pane 1002 and a second pane 1004. The first pane 1002 can display a list of selectable media items, namely, media item A, media item B and media item C. The second pane 1002 can display data contextually associated with the data being displayed in the first pane 1002. In particular, as illustrated in FIG. 10A, the data being displayed in the second pane 1002 can include an image 1008 and text 1010 which pertain to the media item A. In this embodiment, one of the media items being listed in the first pane 1006 is entitled, labeled or described using a textual description which may or may not exceed the width of the first pane as shown in FIG. 10A. The display screen 1000 illustrated in FIG. 10A can be considered a default presentation.

FIG. 10B illustrates a display screen 1020 according to one embodiment of the invention. The display screen 1020 includes a first pane 1022 and a second pane 1024. The first pane 1022 can displays a list of selectable media items, namely, media item A, media item B and media item C. Here, a user has interacted with the first pane to select the "Media item C remix." Hence, in this example, the label, title or other description for the "Media item C remix" is larger than any of the labels, titles or other descriptions displayed in the first pane 1002 of the display screen 1020. As a result, the display screen 1020 can allocate a greater portion of its display screen area to the first pane 1022. Hence, as illustrated in FIG. 10B, the first pane 1022 has a larger size than the second pane 1024. With the enlarged first pane 1022, the longer media description, namely, "media item C remix" can be fully visible within the first pane 1022. However, as the first pane 1022 gets larger, the second pane 1024 gets smaller. Since the size of the second pane 1024 is reduced as compared to the size of the second portion 1004 illustrated in FIG. 10A, to present the same information in the second portion 1024, in one embodiment, the second data can be reformatted, distorted, re-sized, scaled, repositioned, etc. so as to present the second data within second pane 1024 having the reduced size.

The second pane 1024 can display data contextually associated with the data being displayed in the first pane 1022. In particular, as illustrated in FIG. 10B, the second data being displayed in the second pane 1024 can include an image 1028 and text 1030 which pertain to the selected item "Media item C remix" from the first pane 1022. As an example, the image 1028 can represent a modified image that is reformatted, distorted, re-sized, scaled, repositioned as compared to the image 1008 illustrated in FIG. 10A. The text 1030 can also be compressed or displayed in a smaller font so as to fit within the second pane 1024 when having the reduced size.

The display screen 1020 illustrated in FIG. 10B can be considered an enlarged presentation. The enlarged presentation can be triggered by various situations. As one example, when user interaction with the first pane 1022 operates to scroll through the displayed list of media items, the enlarged presentation format can be used. In the enlarged presentation format, the width of the first portion is enlarged. When using the enlarged presentation format, the first data displayed in the first pane 1022 can also be reformatted, distorted, re-sized, scaled, repositioned to enlarge the first data. As another example, when the user identifies an item in the display list of item that can benefit from additional display area, such as illustrated in FIG. 10B, the first pane can be enlarged for that item itself or for the entire first pane.

After being in the enlarged presentation, a display screen can return to a default presentation. FIG. 10C illustrates a display screen 1040 that can be presented following the display screen 1000 illustrated in FIG. 10A or the display screen 1020 illustrated in FIG. 10B.

Also, the enlarged presentation can be applied for the first portion or the second portion. In other words, whichever portion (e.g., pane) a user shows interest in can be enlarged for enhanced viewing. User interaction with the different potions of a display screen can be used to determine user interest.

In another embodiment, if user interaction does not serve to determine contextually relevant content to be displayed, then other content available on the electronic device could be displayed, For example, the other content can be content on the electronic device that is randomly chosen, According to another embodiment of the invention a display screen having multiple panes can adjust the respective sizes of the panes depending on data to be presented in the display screen. The display screen is a graphical user interface that is displayed on a display (display device) of an electronic device, such as a mobile electronic device. In one implementation, if first data to be displayed in a first pane requires or can benefit from an enlarged display region, the first pane can be enlarged and a second pane can be reduced. When the multiple panes are transitioning to different sizes one or more transition effects (e.g., animation, cross-fade, kens burn effect, etc.) can be used.

Figure 11:
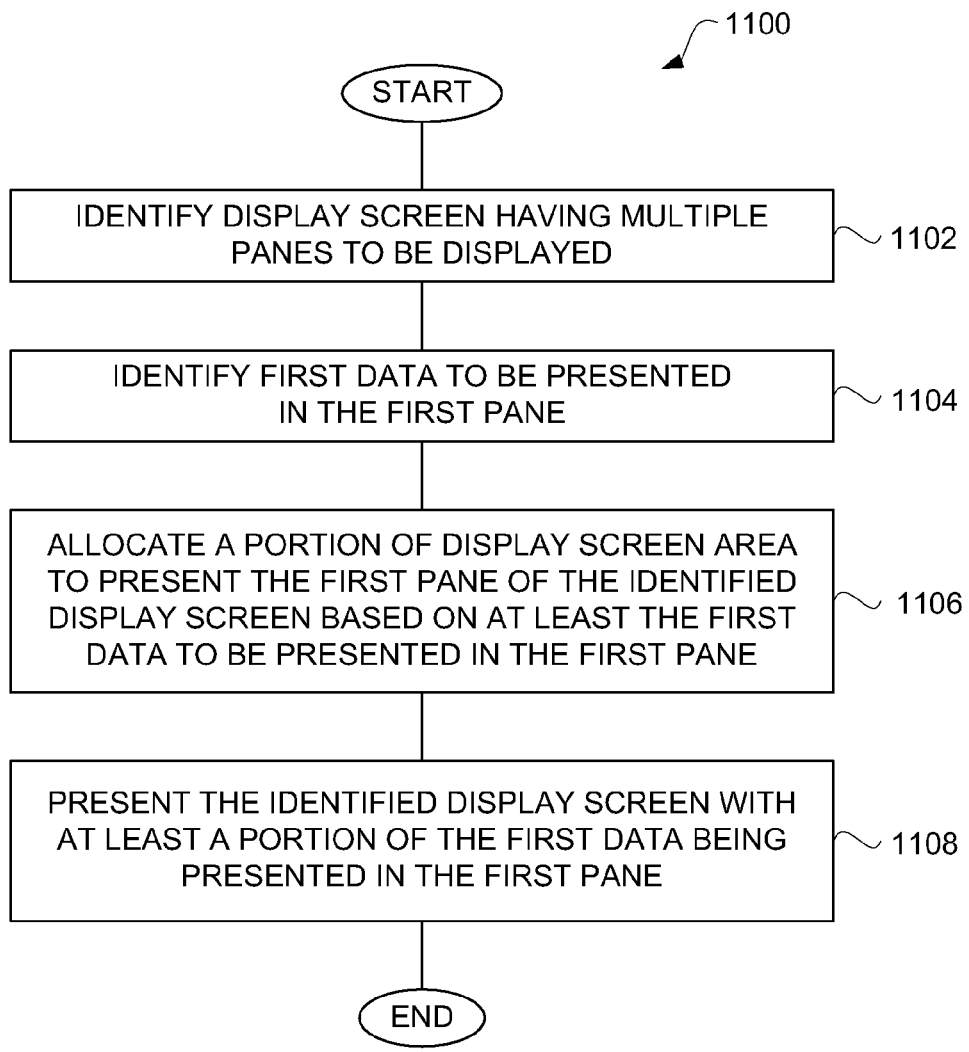
FIG. 11 is a flow diagram of a display screen presentation process according to one embodiment of the invention

FIG. 11 is a flow diagram of a display screen presentation process 1100 according to one embodiment of the invention. The display screen presentation process 1100 is, for example, performed by an electronic device having a display. The display screen presentation process 1100 operates to display a display screen on the display of the electronic device.

The display screen presentation process 1100 can initially identify 1102 a display screen having multiple panes to be displayed. For example, the display screen to be displayed can include a first pane and a second pane. In addition, first data to be presented in the first pane of the identified display screen can be identified 1104. After the first data has been identified 1104, a portion of display screen area for the display screen can be allocated 1106 to present the first pane of the identified display screen. In one embodiment, the portion of the display screen area being allocated 1106 to the first pane of the identified display screen can be based on at least the first data to be presented in the first pane. For example, if the first data requires a significant portion of the display screen area, the resulting display screen can allocate 1106 more of its display screen area to the first pane and therefore less of its display screen area to the second pane. After the portion of the display screen area for the display screen is allocated 1106, the identified display screen can be presented 1108 on the display associated with the electronic device performing the display screen presentation process 1100. In presenting 1108 the identified display screen, at least a portion of the first data is presented in the first pane.

Figure 12:
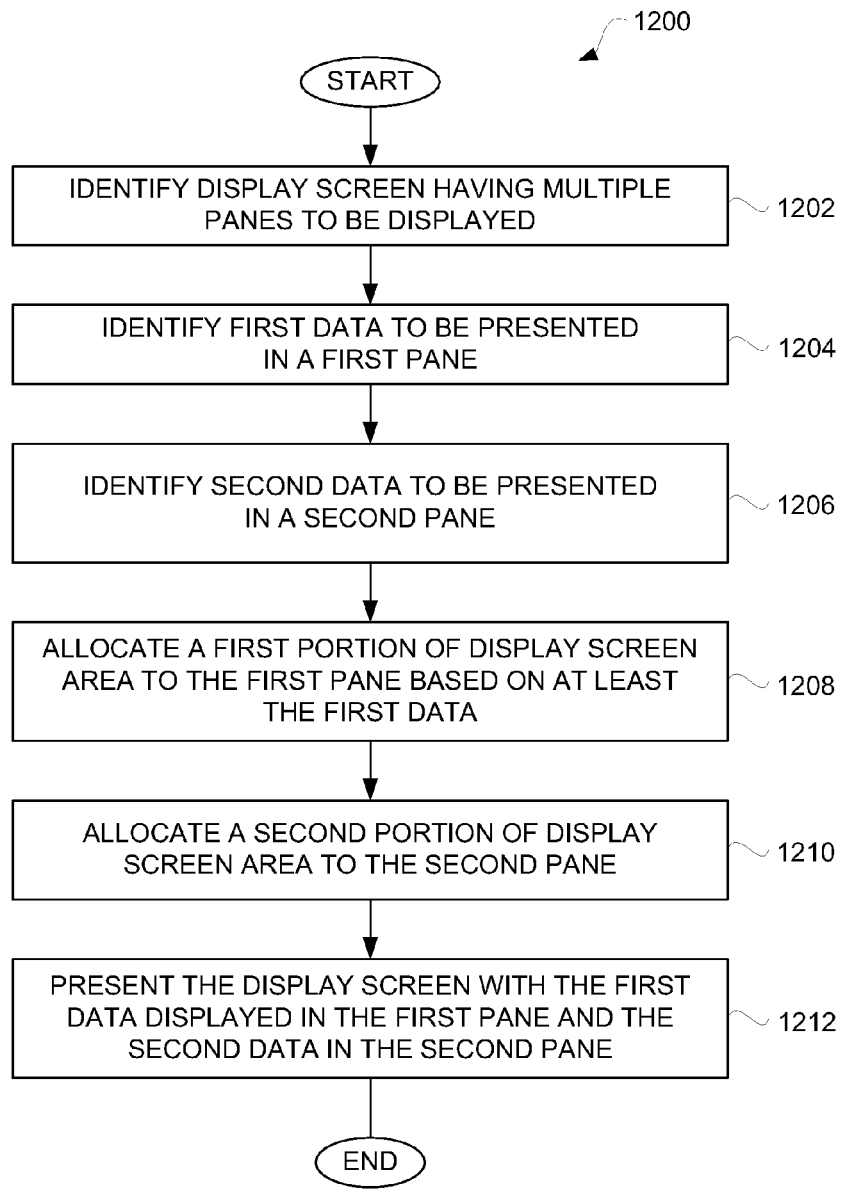
FIG. 12 is a flow diagram of a display screen presentation process according to one embodiment of the invention.

FIG. 12 is a flow diagram of a display screen presentation process 1200 according to one embodiment of the invention. The display screen presentation process 1200 is, for example, performed by an electronic device having a display. The display screen presentation process 900 operates to display a display screen on the display of the electronic device.

The display screen presentation process 1200 can initially identify 1202 a display screen having multiple panes to be displayed. Additionally, first data to be presented in a first pane of the display screen can be identified 1204, and second data to be presented in a second pane of the display screen can be identified 1206. In one implementation, the second data to be presented in the second pane can be based on the first data to be presented in the first pane. For an example, in the second data can be contextually related to the first data generally or a specific portion (e.g., item) of the first data.

Next, a first portion of a display screen area can be allocated 1208 to the first pane based on at least the first data. In other words, the portion of the display screen area being allocated 1208 to the first pane can be dependent on the first data. In addition, a second portion of the display screen area can be allocated 1210 to the second pane. When the display screen has only first and second panes, the second portion can also be also be considered a remaining portion. Thereafter, the display screen can be presented 1212 with the first data displayed in the first pane and the second data displayed in the second pane.

In one embodiment, since the display screen area allocated to the second pane can be limited, the amount, format or arrangement by which the second data is displayed in the second pane can also vary. In this manner, the second data can be adapted to the available display screen area for the second pane. The adaptation of the second data can, for example, reformat, distort, re-size, scale, reposition, etc. the second data for display in the limited area of the second pane.

Figure 13A:
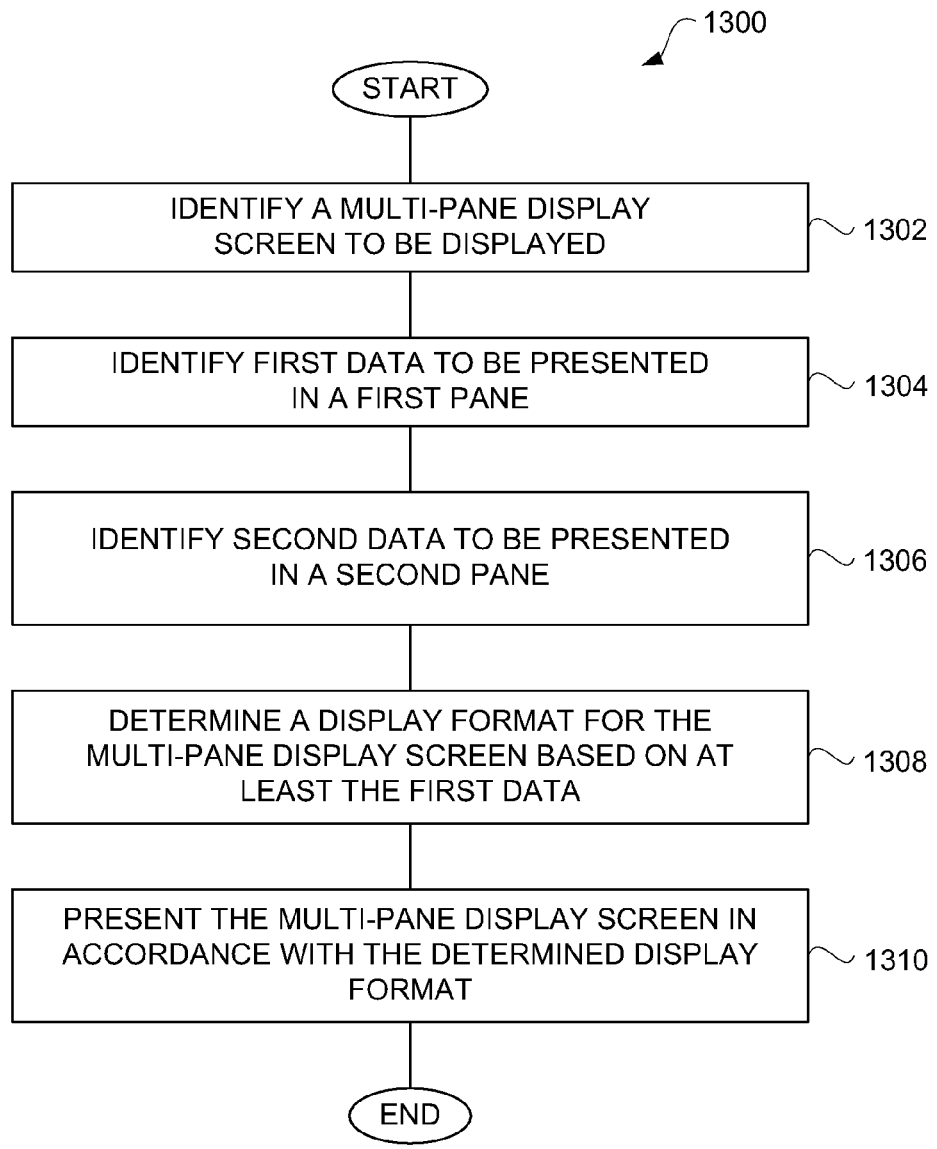
FIG. 13A is a flow diagram of a display screen presentation process according to one embodiment of the invention.

FIG. 13A is a flow diagram of a display screen presentation process 1300 according to one embodiment of the invention. The display screen presentation process 1300 is, for example, performed by an electronic device having a display. The display screen presentation process 1300 operates to display a multi-pane display screen on the display of the electronic device.

The display screen presentation process 1310 can initially identify 1302 a multi-pane display screen to be presented. Next, first data to be presented in a first pane of the multi-pane display screen can be identified 1304. In addition, second data to be presented in a second pane of the multi-pane display screen can be identified 1306. A display format for the multi-pane display screen can be determined 1308 based on at least the first data. The display format can alternatively be determined based on at least the first data and the second data. Further, the display format being determined can be dynamically computed (e.g., as data is identified for display) (i.e., dynamic format) or chosen from a plurality of predetermined formats (i.e., static format). Thereafter, the multi-pane display screen can be presented 1310 on the display device in accordance with the determined display format.

Figure 13B:
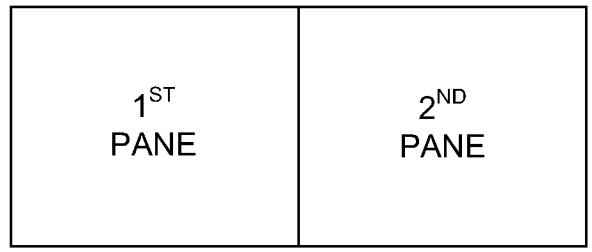
FIGS. 13B-13D are exemplary display screen formats for a multi-pane display screen according to certain embodiments of the invention.
Figure 13C:
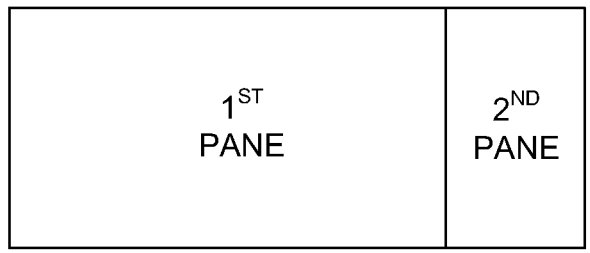
Figure 13D:
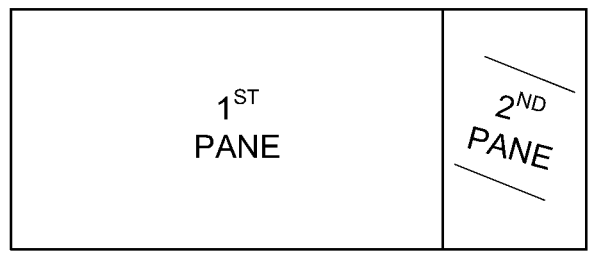

FIGS. 13B-13D are exemplary display screen formats for a multi-pane display screen according to certain embodiments of the invention. FIG. 13B illustrates a display screen format have a balance split-pane design. FIG. 13C illustrates a display screen format with an unbalanced split-pane design. In the unbalanced split-pane design, a primary pane is allocated most of the area of the display screen, and a secondary pane is allocated a remaining portion of the area of the display screen. FIG. 13D also illustrates a display screen format with an unbalanced split-pane design. The panes of the unbalanced split-pane design in FIG. 13D is similar to the unbalanced split-pane design in FIG. 13C. However, the secondary pane the unbalanced split-pane design in FIG. 13D presents data with a perspective distortion to provide a 3D-like effect.

In general, it should be understood that the various display screen formats for split-pane designs can have limits on how large the primary pane can get and/or how small the secondary pane can get. For example, one exemplary limitation could be that the primary pane cannot exceed seventy-five (75%) of the display screen area. Also, it should also be understood that in the event that a pane is not large enough to simultaneously present it corresponding data, then additional techniques can be utilized to enable other portions of the corresponding data to be displayed. For example, to view additional characters that describe a media item, horizontal scrolling of the descriptive information for the media item can be utilized.

FIGS. 14A-14D are exemplary display screens according to various embodiments of the invention. These display screens have first and second panes that are used to display data. A display screen has a finite amount of area, and the display screen area is allocated between the first and second panes. In one environment, at least one of the panes of a display screen is sized or determined based on the data to be presented in that pane. The size of at least one of the panes can be predetermined for a given display screen or can be determined dynamically dependent on the data being displayed by the display screen.

Figure 14A:
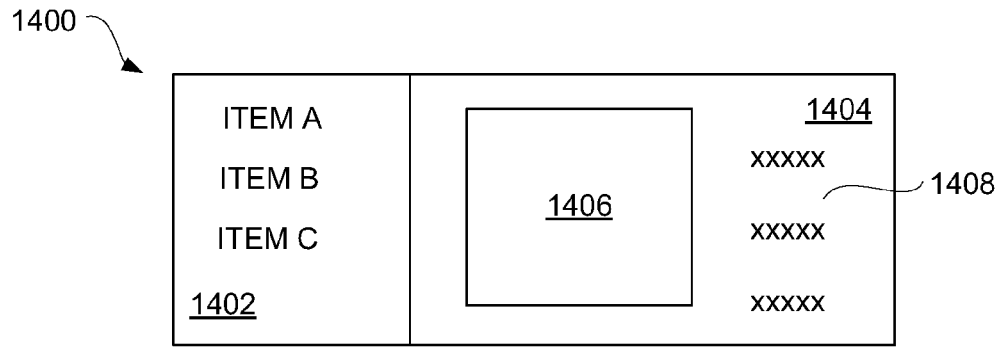
FIGS. 14A-14D are exemplary display screens according to various embodiments of the invention.

FIG. 14A illustrates a display screen 1400 according to one embodiment of the invention. The display screen 1400 has a multi-pane format that includes a first pane 1402 and a second pane 1404. The first pane 1402 displays a list of selectable items, namely, item A, item B and item C. The second pane 1404 can display data contextually associated with the data being displayed in the first pane 1402. In one implementation, the data displayed in the second pane 1404 can include an image 1406 and text 1408. For example, the image 1406 and the text 1408 can be associated with at least one of the items being displayed in the first pane 1402.

Figure 14B:
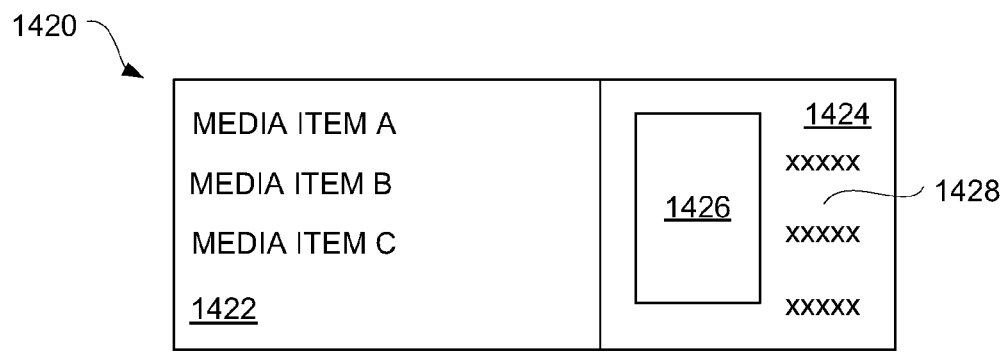

FIG. 14B illustrates a display screen 1420 according to another embodiment of the invention. The display screen 1420 has another multi-pane format that includes a first pane 1422 and a second pane 1424. The first pane 1420 displays a list of selectable media items, namely, media item A, media item B and media item C. The second pane 1424 can display data contextually associated with the data being displayed in the first pane 1420. In particular, as illustrated in FIG. 14B, the data being displayed in the second pane 1424 can include an image 1426 and text 1428. In this embodiment, the media items being listed in the first pane 1422 are entitled, labeled or described using textual descriptions which are longer than those utilized in FIG. 14A. As a result, the display screen 1420 has a greater portion of its display screen area allocated to the first pane 1422. Hence, as illustrated in FIG. 14B, the first pane 1422 has a larger size than the second pane 1424. With the larger first pane 1422, the longer media descriptions can be better displayed for the various media items. However, since the first pane 1422 is larger, the second pane 1424 is smaller. Since the size of the second pane 1424 is reduced as compared to the size of the second portion 1404 illustrated in FIG. 14A, to present the same information in the second portion 1424, in one embodiment, the data can be reformatted, distorted, re-sized, scaled, repositioned, etc. so as to present the data within second pane 1424 having the reduced size. As an example, the image 1426 can represent a distorted image that is horizontally clipped, compressed or distorted as compared to the image 1406 illustrated in FIG. 14A. The text 1428 can also be scaled, compressed or displayed in a smaller font so as to fit within the second pane 1424 having a reduced size. Alternatively or additionally, the amount of text 1428 to be displayed in the second pane 1424 can be reduced so that it fits within the reduced size.

Figure 14C:
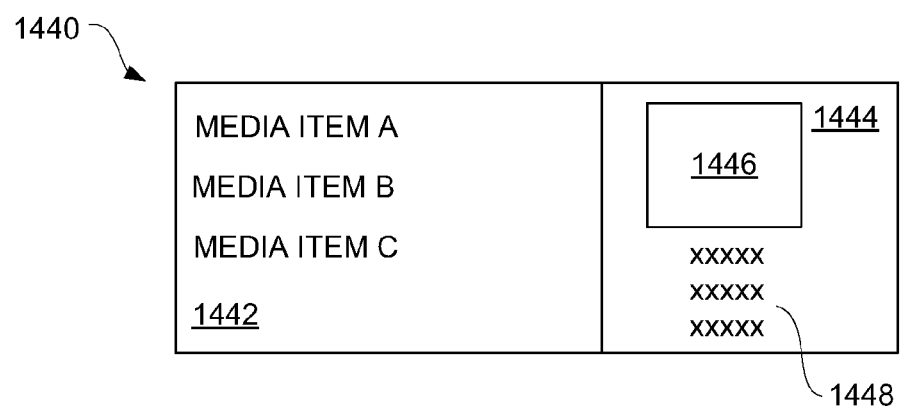

FIG. 14C illustrates a display screen 1440 according to still another embodiment of the invention. The display screen 1440 includes a first pane 1442 and a second pane 1444. The first pane 1442 is similar to the first pane 1422 illustrated in FIG. 14B. However, the second pane 1444 displays the data for the second pane 1444 in a different arrangement as compared to the display of data within the second pane 1424 illustrated in FIG. 14B. The arrangement utilized to display the data in the second pane 1444 presents a smaller image 1446 as well as text 1448 in a vertical configuration. As an example, the text 1448 may not need to be compressed, modified or reduced but the image 1446 can be scaled down to a smaller size to easily fit within the available space in the second pane 1444.

Figure 14D:
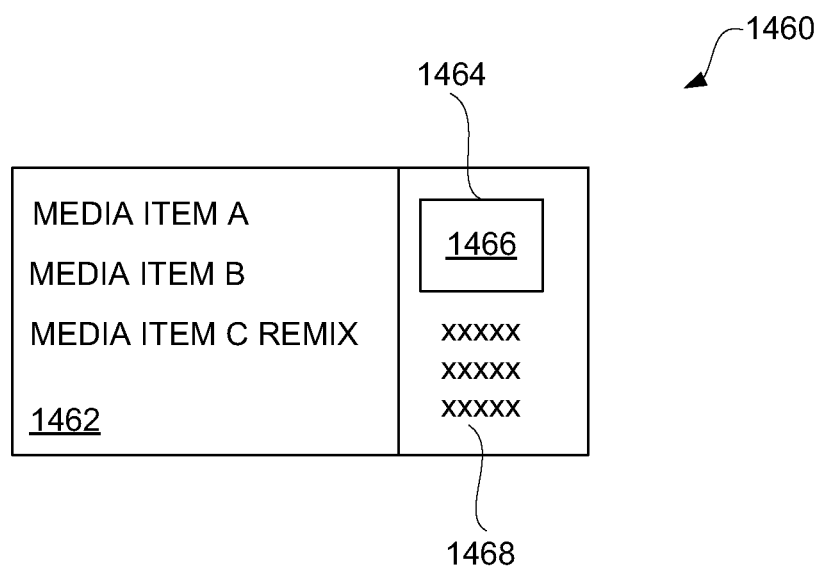

FIG. 14D illustrates a display screen 1460 according to still another embodiment of the invention. The display screen 1460 includes a first pane 1462 and a second pane 1464. The first pane 1420 displays a list of selectable media items, namely, media item A, media item B and media item C remix. In this embodiment, the label, title or other description for the media item C remix is larger than any of the labels, titles or other descriptions displayed in the first pane 1422 of the display screen 1420 illustrated in FIG. 14B. The second pane 1464 can display data contextually associated with the data being displayed in the first pane 1460. In particular, as illustrated in FIG. 14D, the data being displayed in the second pane 1464 can include an image 1466 and text 1468. In this embodiment, one of the media items being listed in the first pane 1462 is entitled, labeled or described using a textual description is then longer than those utilized in FIG. 14B. As a result, the display screen 1460 can allocate a greater portion of its display screen area to the first pane 1462. Hence, as illustrated in FIG. 14D, the first pane 1462 has a larger size than the second pane 1424. The size of the first pane 1462 is larger than the size of the second pane 1424 illustrated in FIG. 14B. With the enlarged first pane 1462, the longer media description, namely, "media item C remix" can be displayed such that it is fully visible in the first pane 1462 for the various media items. However, as the first pane 1462 gets larger, the second pane 1464 can get smaller. Since the size of the second pane 1464 is further reduced as compared to the size of the second portion 1424 illustrated in FIG. 14B, to present the same information in the second portion 1464, in one embodiment, the data can be reformatted, distorted, re-sized, scaled, repositioned, etc. so as to present the data within second pane 1464 having the reduced size. As an example, the image 1466 can represent a modified image that is scaled, clipped, compressed or distorted as compared to the image 1406 illustrated in FIG. 14A. The text 1468 can also be scaled, compressed or displayed in a smaller font than so as to fit within the second pane 1464 having a reduced size. Alternatively or additionally, the amount of text 1468 to be displayed in the second pane 1464 can be reduced so that it fits within the reduced size.

According to another embodiment of the invention a display screen having multiple panes can permit user interaction with a first pane and dynamically cause contextually related information to be presented in a second pane. The display screen is typically a graphical user interface that is displayed on a display of an electronic device, such as a mobile electronic device. For example, a user can identify a selectable item from a list of selectable items presented in the first pane, and in response to the identification, information contextually related to the identified item can be presented in the second pane. In the event that the electronic device does not currently have adequate information available concerning the identified media item, the presentation of content in the second pane can gracefully degrade. For example, when adequate information is unavailable, the presentation of content in the second pane can use basic contextual information (if available) or default information.

Figure 15:
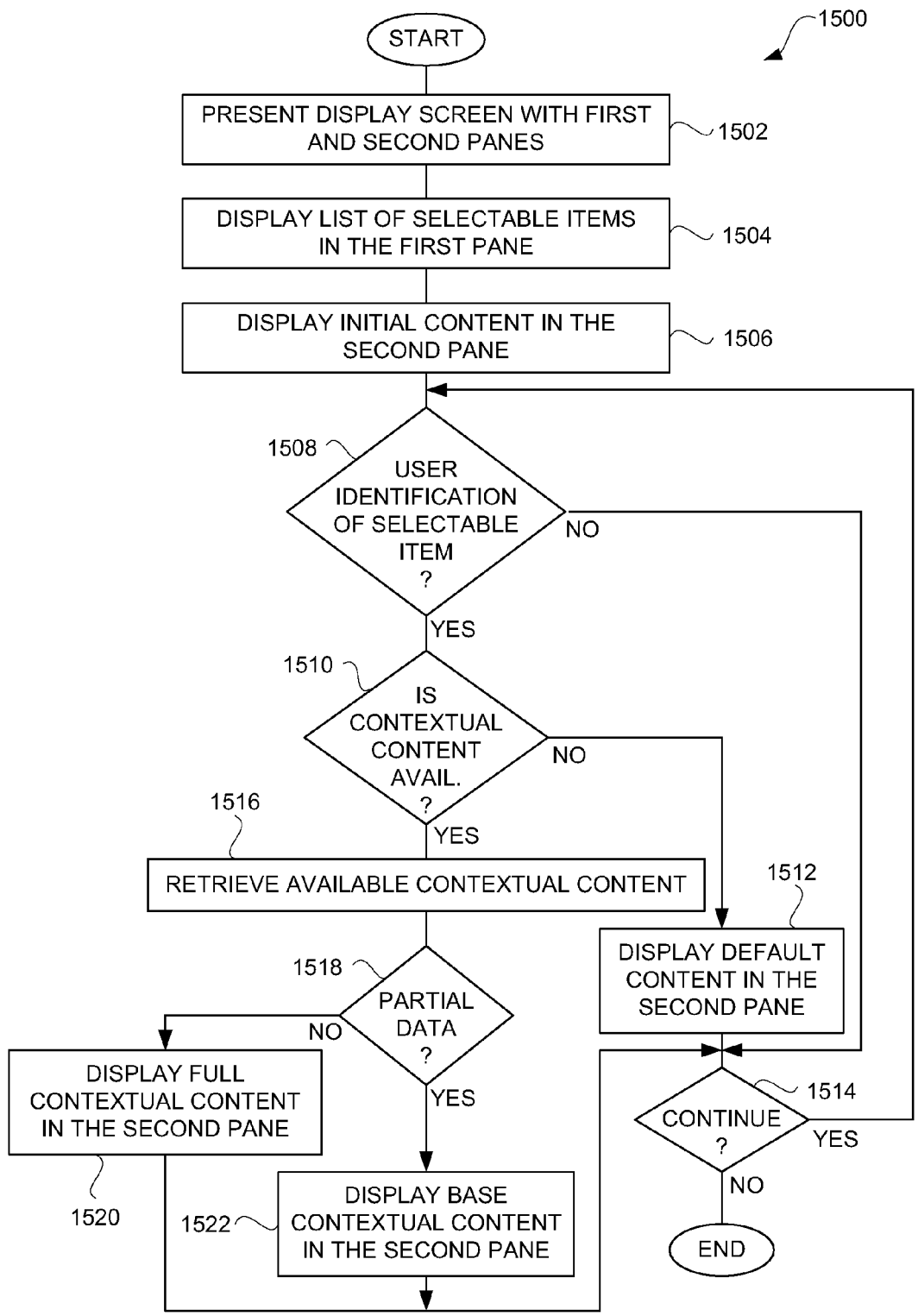
FIG. 15 is a flow diagram of a display screen presentation process according to one embodiment of the invention.

FIG. 15 is a flow diagram of a display screen presentation process 1500 according to one embodiment of the invention. The display screen presentation process 1500 can be performed by an electronic device having a display screen.

The display screen presentation process 1500 can initially present 1502 first and second panes of a multi-pane display screen. In the first pane, a list of selectable items can be displayed 1504. In the second pane, initial content can be displayed 1506. The initial content can be predetermined content for the second pane of the display screen or could represent any of the contextual content discussed below.

A decision 1508 can then determine whether one of the selectable items displayed in the first pane have been identified by user action. Typically, a user can interact with the electronic device to cause identification of one of the selectable items being displayed in the first pane. For example, the user can scroll through the selectable items whereby a referenced selectable item is identified by visual means such as highlighting.

When the decision 1508 determines that the user has identified one of the selectable items from the first pane, a decision 1510 can determine whether contextual content is available. The contextual content refers to content (i.e., data) that is contextually related to the identified one of the selectable items. When the decision 1510 determines that contextual content pertaining to the identified one of the selectable items is not available, default content is displayed 1512 in the second pane. Next, a decision 1514 can determine whether the display screen presentation process 1500 should continue or end. When the decision 1514 determines that the display screen presentation process 1500 should continue, the display screen presentation process 1500 can return to repeat the decision 1508 and subsequent blocks in the display screen presentation process 1500. Alternatively, the decision 1514 can determine that the display screen presentation process 1500 should end. As an example, the display screen presentation process 1500 would end when a user selection is made that causes a next display screen to be displayed. The next display screen may or may not be a multi-pane display screen.

Alternatively, when the decision 1510 determines that contextual content pertaining to the identified one of the selectable items is available, available contextual content can be retrieved 1516. The available contextual content can be fully available or partially available. For example, in one implementation, if all the normally stored content resides locally in the electronic device, then the contextual content is fully available; however, if only part of all the normally stored content resides locally in the electronic device, then the contextual content is only partially available. In one implementation, the electronic device receives content from an external source wirelessly or via a wired connection. For example, the electronic device can receive content by having its content synchronized with content on a host computer. As another example, the electronic device can receive content from a wireless network. In some circumstances the electronic device may only store part of the contextual content for one or more of the selectable items. Contextual content can also be available to the electronic device if the electronic device can at such time access the content from another electronic device via a data bus or a network connection.

After the available contextual content is retrieved 1516, a decision 1518 can determine whether only partial contextual content is available. If the decision 1518 determines that full contextual content is available, then full contextual content can be displayed 1520 in the second pane. On the other hand, if the decision 1518 determines that only partial contextual content is available, then base contextual content can be displayed 1522 in the second pane. The base contextual content represents limited contextual content. Following the blocks 1520 and 1522, the display screen presentation process 1500 can perform the decision 1514 to determine whether the display screen presentation process 1500 should continue or end.

As an example, when the selectable items in the first pane pertain to albums of audios tracks, full contextual content for an album can include a plurality of: title, artist, image (e.g., artwork), genre, track listing, rating, label, copyright, release date, play counts, etc. The full contextual content might also provide ancillary information such as recommendations to other media items, reviews, etc. Basic contextual content for the album would, for example, include title and artist.

In one embodiment, the contextual content being displayed in the second pane can be automatically updated. Hence, if the needed contextual content subsequently becomes available to the electronic device, then the now available contextual content can be displayed in the second pane, provided that the previously identified one of the selectable items from the first pane remains the same. As one example, if the second pane displays the default content, the second pane can later be upgraded to the base content or the full content. As another example, if the second pane displays the base content, the second pane can be upgraded to the full content.

The initial content can be some predetermined content that is guaranteed to be available. The initial content can subsequently be replaced by the default content, the base contextual content or the full contextual content.

Figure 16A:
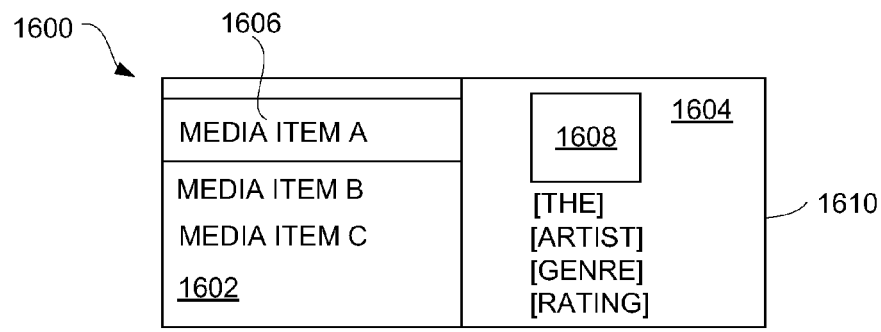
FIGS. 16A-16C are exemplary screen displays according to various embodiments of the invention.
Figure 16B:
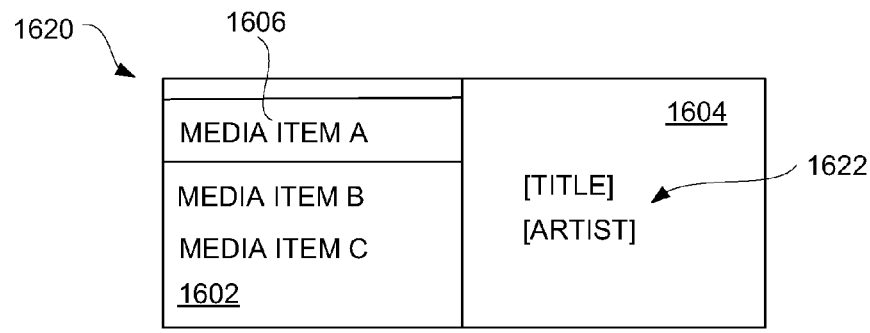
Figure 16C:
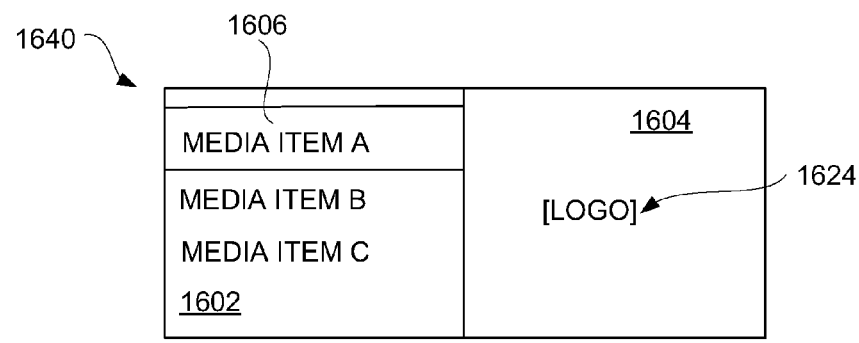

FIGS. 16A-16C are exemplary screen displays according to various embodiments of the invention. These display screens have first and second panes that are used to display data. In one embodiment, one pane displays a list of selectable items, and the second pane displays information that is contextually related to an item displayed in the first pane.

FIG. 16A illustrates a display screen 1600 according to one embodiment of the invention. The display screen 1600 includes a first pane 1602 and a second pane 1604. The first pane 1602 can displays a list of selectable media items, namely, media item A, media item B and media item C. The second pane 1602 can display data contextually associated with the data being displayed in the first pane 1602. In particular, as illustrated in FIG. 16A, the data being displayed in the second pane 1602 can include an image 1608 and media attributes 1610 which pertain to the media item A. The image 1608 can pertain to artwork associated with media item A. The media attributes 1610 can, for example, include a title, artist, genre and rating. In this embodiment, the second pane 1604 can be considered to present full contextual content.

FIG. 16B illustrates a display screen 1620 according to one embodiment of the invention. The display screen 1620 includes the first pane 1602 and the second pane 1604 as in the display screen 1600 illustrated in FIG. 16A. However, in this embodiment, the second pane 1604 of the display screen 1620 displays only basic contextual content. In particular, as illustrated in FIG. 16B, the data being displayed in the second pane 1602 can include minimal media attributes 1622 which pertain to the media item A. The media attributes 1622 can, for example, include a title and artist. In this embodiment, the second pane 1604 can be considered to present basic contextual content.

FIG. 16C illustrates a display screen 1640 according to one embodiment of the invention. The display screen 1640 includes the first pane 1602 and the second pane 1604 as in the display screen 1600 illustrated in FIG. 16A and the display screen 1620 illustrated in FIG. 16B. However, in this embodiment, the second pane 1604 of the display screen 1640 displays default content 1624. The default content 1624 is used when contextual content is unavailable. For example, the default content 1624 can pertain to a logo. As other example, the default content 1624 can include device information, manufacturer information, advertisements, random available content, indication of unavailable content, etc.

Additional detail on transitioning and various other aspects of graphical user interfaces can be found in the following: (i) U.S. patent application Ser. No. 11/899,144, filed Sep. 4, 2007 and entitled "IMAGE ANIMATION WITH TRANSITIONAL IMAGES," which is hereby incorporated herein by reference for all purposes; (ii) U.S. patent application Ser. No. 11/899,033, filed Sep. 4, 2007 and entitled "ANTI-ALIASING OF A GRAPHICAL OBJECT," which is hereby incorporated herein by reference for all purposes; and (iii) U.S. patent application Ser. No. 11/899,024, filed Sep. 4, 2007 and entitled "USER INTERFACE ELEMENTS CLONING AND TRANSITIONS," which is hereby incorporated herein by reference for all purposes.

The portable electronic device utilized herein can, for example, correspond to a computing device (e.g., personal computer), mobile phone (e.g., cellular phone), personal digital assistant (PDA), media player (e.g., music, videos, games, images), media storage device, camera, remote control, and/or the like. The electronic device may also be a multi-functional device that combine two or more of these device functionalities into a single device. Examples of multi-functional devices can be found in U.S. Patent Application Publication No. 20060197753, entitled "MULTI-FUNCTIONAL HAND-HELD DEVICE", which is herein incorporated by reference.

Figure 17:
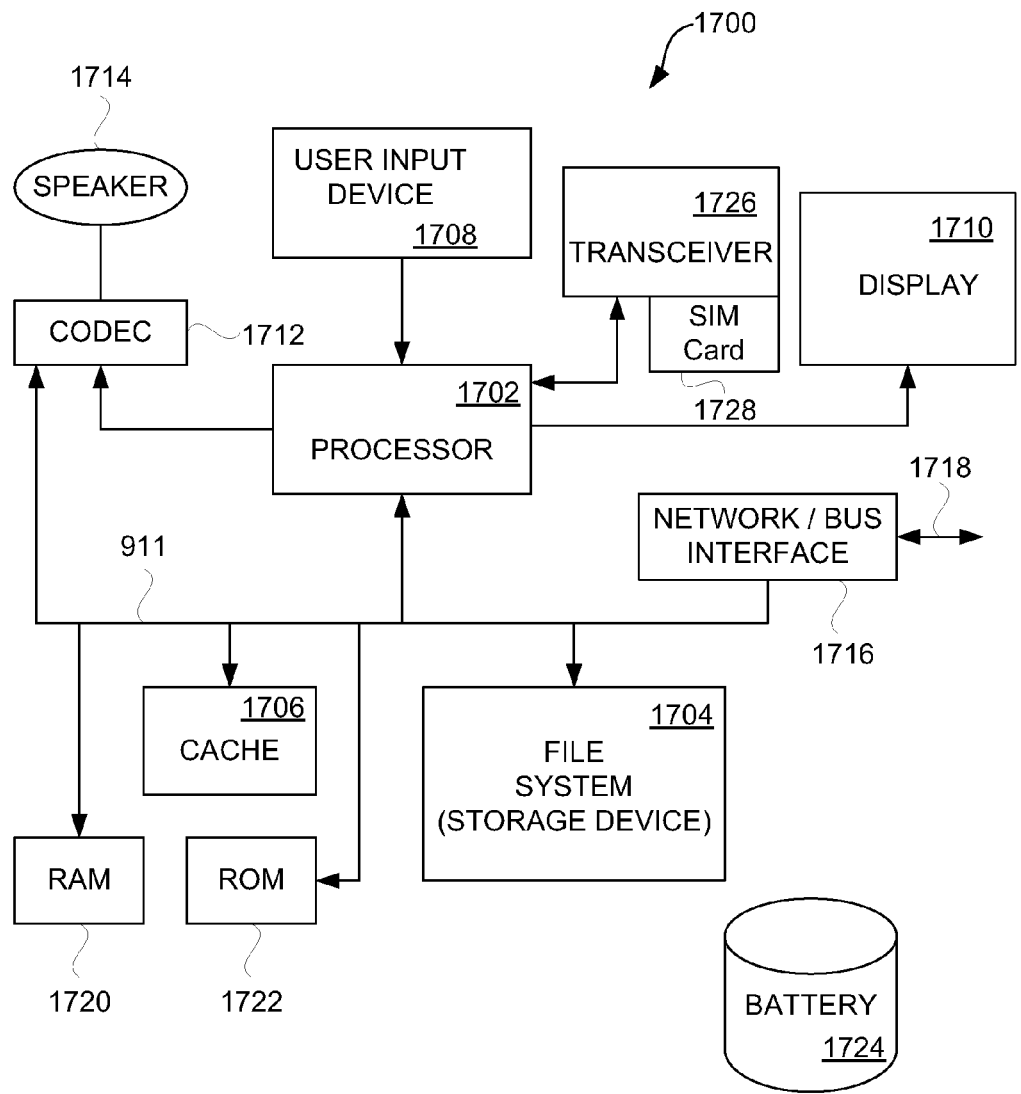
FIG. 17 is a block diagram of a mobile multi-function device according to one embodiment of the invention.

FIG. 17 is a block diagram of a mobile multi-function device 1700 according to one embodiment of the invention. The mobile multi-function device 1700 can include the circuitry of a portable electronic device that can perform the operations described above. The mobile multi-function device 1700 includes hardware and software components to provide at least two functions, namely, a media playback function (including display screen/menu presentations) and a wireless voice communications function. When providing media playback, the mobile multi-function device 1700 can operate as a media player capable of playing (including displaying) media items. The media items can, for example, pertain to audio items (e.g., audio files or songs), videos (e.g., movies) or images (e.g., photos). When providing wireless voice communications, the mobile multi-function device 1700 can operate as a mobile telephone (e.g., cellular phone).

The mobile multi-function device 1700 includes a processor 1702 that pertains to a microprocessor or controller for controlling the overall operation of the mobile multi-function device 1700. The mobile multi-function device 1700 stores media data pertaining to media items in a file system 1704 and a cache 1706. In one embodiment, the file system 1704 is implemented by a storage disk or a plurality of disks. In another embodiment, the file system 1704 is implemented by EEPROM or Flash type memory. The file system 1704 typically provides high capacity storage capability for the mobile multi-function device 1700. However, because the access time to the file system 1704 can be relatively slow, the mobile multi-function device 1700 can also include a cache 1706. The cache 1706 is, for example, Random-Access Memory (RAM) provided by semiconductor memory. The relative access time to the cache 1706 is substantially shorter than for the file system 1704. However, the cache 1706 does not have the large storage capacity of the file system 1704. Further, the file system 1704, when active, consumes more power than does the cache 1706. The power consumption is often a concern when the mobile multi-function device 1700 is a portable mobile multi-function device that is powered by a battery 1724. The mobile multi-function device 1700 also includes a RAM 1720 and a Read-Only Memory (ROM) 1722. The ROM 1722 can store programs, utilities or processes to be executed in a non-volatile manner. The ROM 1722 can be implemented by an EEPROM or Flash type memory so as to provide writable non-volatile data storage. The RAM 1720 provides volatile data storage, such as for the cache 1706.

In one embodiment, to support wireless voice communications, the mobile multi-function device 1700 includes a transceiver 1726 and a SIM card 1728. The transceiver 1726 supports wireless communication with a wireless network (such as a wireless cellular network). The SIM card 1728 includes an identifier (e.g., SIM identifier) can be used by the mobile multi-function device 1700 to gain access and utilize the wireless network. In other embodiments, a SIM card 1728 is not utilized.

The mobile multi-function device 1700 also includes a user input device 1708 that allows a user of the mobile multi-function device 1700 to interact with the mobile multi-function device 1700. For example, the user input device 1708 can take a variety of forms, such as a button, keypad, dial, etc. Still further, the mobile multi-function device 1700 includes a display 1710 (screen display) that can be controlled by the processor 1702 to display information to the user. A data bus 1711 can facilitate data transfer between at least the file system 1704, the cache 1706, the processor 1702, and the CODEC 1712.

In one embodiment, the mobile multi-function device 1700 serves to store a plurality of media items (e.g., songs) in the file system 1704. When a user desires to have the mobile multi-function device play a particular media item, a list of available media items is displayed on the display 1710. Then, using the user input device 1708, a user can select one of the available media items. The processor 1702, upon receiving a selection of a particular media item, supplies the media data (e.g., audio file) for the particular media item to a coder/decoder (CODEC) 1712. The CODEC 1712 then produces analog output signals for a speaker 1714. The speaker 1714 can be a speaker internal to the mobile multi-function device 1700 or external to the mobile multi-function device 1700. For example, headphones or earphones that connect to the mobile multi-function device 1700 would be considered an external speaker.

The mobile multi-function device 1700 also includes a bus interface 1716 that couples to a data link 1718. The data link 1718 allows the mobile multi-function device 1700 to couple to a host device (e.g., host computer or power source). The data link 1718 can also provide power to the mobile multi-function device 1700.

The portable electronic device utilized herein can further be a hand-held electronic device. The term hand-held generally means that the electronic device has a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

The digital media assets (i.e., digital media items) can pertain to video items (e.g., video files or movies), audio items (e.g., audio files or audio tracks, such as for songs (music) or audiobooks), or image items (e.g., photos). The digital media assets can also include or be supplemented by text or multimedia files.

The various aspects, features, embodiments or implementations of the invention described above can be used alone or in various combinations.

The invention is preferably implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different aspects, embodiments or implementations may, but need not, yield one or more of the following advantages. One advantage of the invention is that limited size display screens are able to be used efficiently and effectively. Another advantage is that contextually relevant information (e.g., images) can be automatically presented on a portion of a display screen while also displaying a menu of a menu hierarchy. Further, as user interacts with the menu, the contextually relevant information being presented can dynamically to remain contextually relevant. Still another advantage of the invention is that contextually relevant information (e.g., images) can be displayed in a skewed manner to produce a three-dimensional effect which is not only a display area saver but also visually elegant.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for presenting a display screen on a display of a portable electronic device, said method comprising:
    identifying a display screen to be displayed on the display of the portable electronic device, the identified display screen being one of a plurality of display screens that are available to be displayed on the display of the portable electronic device, and the identified display screen having at least a first pane and a second pane, wherein the size of the second pane is determined dynamically dependent on contextually relevant information to be displayed on the identified display screen;
    displaying selectable menu items in the first pane of the identified display screen; and
    displaying the contextually relevant information in the second pane of the identified display screen, wherein the contextually relevant information comprises at least a graphical image;
    wherein the width of the second pane is smaller than the width of the graphical image, and
    wherein the graphical image is horizontally compacted or clipped to correlate to the width of the second pane.

2. A method as recited in claim 1, wherein the graphical image is related to at least one of the selectable menu items in the first pane.

3. A method as recited in claim 1, wherein the graphical image is related to a designated one of the selectable menu items in the first pane.

4. A method as recited in claim 3, wherein the designated one of the selectable menu items is an album, and the graphical image is album artwork for the album.

5. A method as recited in claim 3, wherein within the second pane, the graphical image is displayed in a skewed fashion to provide a three-dimensional (3D) effect.

6. A method as recited in claim 5, wherein the 3D effect is a two-dimensional rendering but the graphical image is displayed such that it has a depth of field.

7. A method as recited in claim 1, wherein the graphical image is skewed to provide a depth of field.

8. A method as recited in claim 1, wherein the graphical image is related to a media item stored on the portable electronic device.

9. A method as recited in claim 1,
    wherein said method further comprises determining a configuration for the first and second panes of the identified display screen, wherein said displaying of the selectable menu items in the first pane is in accordance with the determined configuration, and wherein said displaying of the contextually relevant information in the second pane is in accordance with the determined configuration.

10. A method for presenting media information on a display of a portable electronic device, said method comprising:
   displaying a first menu in a first portion of a display screen on the display, the first menu including a plurality of selectable menu items;
   determining a first media item to be displayed from a plurality of media items resident on the portable electronic device;
   displaying a graphic corresponding to the first media item in a second portion of the display screen on the display, wherein the size of the second portion is determined dynamically dependent on the graphic;
   subsequently determining a second media item to be displayed from the plurality of media items resident on the portable electronic device;
   enlarging the first portion of the display screen and decreasing the second portion of the display screen; and
   thereafter displaying a graphic corresponding to the second media item in the second portion of the display screen on the display, wherein the graphic corresponding to the second media item is modified to fit within the decreased second portion of the display screen.

11. A method as recited in claim 10, wherein the graphic is a graphical image.

12. A method as recited in claim 10, wherein said displaying of the graphic corresponding to the second media item is displayed by cross-fading out the graphic corresponding to the first media item and cross-fading in the graphic corresponding to the second media item.

13. A method as recited in claim 10, where while said displaying displays the graphic corresponding to the second media item, the graphic is at least partially automatically panned in the second portion of the display screen.

14. A method as recited in claim 10, wherein said method further comprises:
   receiving a selection of one of the selectable menu items in the first menu; and
   displaying, in response to said receiving of the selection of one of the selectable menu items, a second menu in the first portion of a display screen on the display, the second menu including a plurality of selectable menu items.

15. A method as recited in claim 14, wherein the plurality of selectable menu items of the second menu are hierarchically categorized under the selected media item from the first menu.

16. A method as recited in claim 15, wherein said method further comprises:
   determining a third media item to be displayed based on the set of media items resident on the portable electronic device that correspond to the second menu; and
   displaying a graphic corresponding to the third media item in the second portion of the display screen on the display.

17. A method as recited in claim 15, wherein said method further comprises:
   visually identifying one of the media items in the second menu; and
   displaying, in the second portion of the display screen on the display, a graphic corresponding to the visually identified media item in the second menu.

18. A method as recited in claim 14, wherein the first menu is part of a display screen having a first layout, wherein said method further comprises:
   determining whether the second menu is part of a display screen having a second layout different than the first layout; and
   transitioning from the first layout to the second layout by visually sliding out the first menu while sliding in the second menu, such that during transitioning a portion of the first menu is displayed while a portion of the second menu is displayed.

19. A method as recited in claim 14, wherein said method further comprises:
   transitioning from displaying the first menu to the second menu by visually sliding out the first menu while sliding in the second menu, such that during transitioning a portion of the first menu is displayed while a portion of the second menu is displayed.

20. A computer readable medium including at least executable computer program code tangibly stored thereon for presenting a display screen on a display of a portable electronic device, said computer readable medium comprising:
   computer program code for identifying a display screen to be displayed on the display of the portable electronic device, the identified display screen being one of a plurality of display screens that are available to be displayed on the display of the portable electronic device, and the identified display screen having at least a first portion and a second portion, wherein the size of the second portion is determined dynamically dependent on contextually relevant information to be displayed on the identified display screen;
   computer program code for displaying selectable menu items in the first portion of the identified display screen; and
   computer program code for displaying the contextually relevant information in the second portion of the identified display screen, wherein the contextually relevant information comprises at least a graphical image;
   wherein the width of the second portion is smaller than the width of the graphical image, and
   wherein the graphical image is horizontally compacted or clipped to correlate to the width of the second portion.

21. A computer readable medium as recited in claim 20, wherein the graphical image is related to a designated one of the selectable menu items in the first portion or that is related to a media item stored on the portable electronic device.

22. A computer readable medium as recited in claim 20, wherein within the second portion, the graphical image is displayed in a skewed fashion so as to have a depth of field.

23. A graphical user interface for a portable electronic device, comprising:
   a first portion that displays a particular menu from a plurality of menus that form a hierarchical menu system, the particular menu including a plurality of selectable items; and
   a second portion that displays at least a portion of a particular graphical image, the particular graphical image being chosen from a plurality of graphical images based on (i) a designated one of the selectable menu items in the first portion or (ii) a media item stored on the portable electronic device, wherein the size of the second portion is determined dynamically dependent on the graphical image,
   wherein the width of the second portion is smaller than the width of the particular graphical image, and
   wherein the particular graphical image is horizontally compacted or clipped to correlate to the width of the second portion.

24. A mobile computing device, comprising:
a display device for displaying a graphic user interface; and
a processing device for operating to present the graphical user interface on said display device,
wherein the graphical user interface includes at least
 a first portion that displays a particular menu from a plurality of menus that form a hierarchical menu system, the particular menu including a plurality of selectable items; and
 a second portion that displays at least a portion of a particular graphical image,
wherein the second portion is determined dynamically dependent on the graphical image, the particular graphical image being chosen from a plurality of graphical images based on (i) a designated one of the selectable menu items in the first portion or (ii) a media item stored on the portable electronic device,
wherein the width of the second portion is smaller than the width of the particular graphical image, and
wherein the particular graphical image is horizontally compacted or clipped to correlate to the width of the second portion.

25. A mobile computing device as recited in claim 24, wherein said mobile computing device is a handheld device.

26. A system for presenting a display screen on a display of a portable electronic device, said system comprising:
one or more processors;
memory storing instructions, which, when executed by the one or more processors, causes the one or more processors to perform operations comprising:
identifying a display screen to be displayed on the display of the portable electronic device, the identified display screen being one of a plurality of display screens that are available to be displayed on the display of the portable electronic device, and the identified display screen having at least a first pane and a second pane, wherein the size of the second pane is determined dynamically dependent on contextually relevant information to be displayed on the identified display screen;
displaying selectable menu items in the first pane of the identified display screen; and
displaying the contextually relevant information in the second pane of the identified display screen, wherein the contextually relevant information comprises at least a graphical image;
wherein the width of the second pane is smaller than the width of the graphical image, and
wherein the graphical image is horizontally compacted or clipped to correlate to the width of the second pane.

27. A system as recited in claim 26, wherein the graphical image is related to at least one of the selectable menu items in the first pane.

28. A system as recited in claim 26, wherein the graphical image is related to a designated one of the selectable menu items in the first pane.

29. A system as recited in claim 28, wherein the designated one of the selectable menu items is an album, and the graphical image is album artwork for the album.

30. A system as recited in claim 28, wherein within the second pane, the graphical image is displayed in a skewed fashion to provide a three-dimensional (3D) effect.

31. A system as recited in claim 30, wherein the 3D effect is a two-dimensional rendering but the graphical image is displayed such that it has a depth of field.

32. A system as recited in claim 26, wherein the graphical image is skewed to provide a depth of field.

33. A system as recited in claim 26, wherein the graphical image is related to a media item stored on the portable electronic device.

34. A system as recited in claim 26,
wherein said method further comprises determining a configuration for the first and second panes of the identified display screen,
wherein said displaying of the selectable menu items in the first pane is in accordance with the determined configuration, and
wherein said displaying of the contextually relevant information in the second pane is in accordance with the determined configuration.

* * * * *

UNITED STATES PATENT AND TRADEMARK OFFICE
CERTIFICATE OF CORRECTION

| | | |
|---|---|---|
| PATENT NO. | : 8,732,611 B2 | Page 1 of 1 |
| APPLICATION NO. | : 11/849923 | |
| DATED | : May 20, 2014 | |
| INVENTOR(S) | : Bull et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1484 days.

Signed and Sealed this
Twenty-eighth Day of July, 2015

Michelle K. Lee
*Director of the United States Patent and Trademark Office*